(12) United States Patent
Douglas et al.

(10) Patent No.: US 11,408,967 B2
(45) Date of Patent: Aug. 9, 2022

(54) LOCATION OF DEVICES USING LOW BANDWIDTH COMMUNICATION PROTOCOLS IN A MESH NETWORK

(71) Applicant: SIGNIFY HOLDING B.V., Eindhoven (NL)

(72) Inventors: Bruce Andrew Carl Douglas, Fayetteville, GA (US); Ameya Ainapure, Atlanta, GA (US); Dominic Pritham, Fairburn, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 427 days.

(21) Appl. No.: 16/547,315

(22) Filed: Aug. 21, 2019

(65) Prior Publication Data

US 2020/0064435 A1 Feb. 27, 2020

Related U.S. Application Data

(60) Provisional application No. 62/720,563, filed on Aug. 21, 2018.

(51) Int. Cl.
*H04W 4/38* (2018.01)
*G01S 5/02* (2010.01)
*H04W 64/00* (2009.01)

(52) U.S. Cl.
CPC .............. *G01S 5/0289* (2013.01); *H04W 4/38* (2018.02); *H04W 64/003* (2013.01)

(58) Field of Classification Search
CPC ........ G01S 5/0289; G01S 5/0036; G01S 5/02; G01S 5/0205; H04W 4/38; H04W 64/003; H04W 4/021; H04W 4/80; H04W 64/00
See application file for complete search history.

(56) References Cited

U.S. PATENT DOCUMENTS

| 7,323,991 B1* | 1/2008 | Eckert | G07C 9/28 340/572.1 |
|---|---|---|---|
| 7,994,723 B2 | 8/2011 | Budde et al. | |
| 8,829,821 B2 | 9/2014 | Chobot et al. | |
| 9,072,133 B2 | 6/2015 | Chemel et al. | |
| 2013/0170374 A1* | 7/2013 | Aljadeff | G01S 5/14 370/252 |
| 2016/0165570 A1* | 6/2016 | Kim | G01S 5/02 455/456.2 |

* cited by examiner

*Primary Examiner* — Marcus Hammonds

(57) ABSTRACT

A system can include a first electrical device having a first controller that includes a first transceiver, where the first transceiver sends a first signal using a first communication protocol. The system can also include a second electrical device that includes a second controller having a second transceiver, where the second transceiver receives the first signal, measures a first strength of the first signal, generates a first table that includes the first strength and a first ID of the first electrical device, and sends a second signal using a second communication protocol. The user system can also include a gateway that receives the second signal, where the second signal includes the first strength and the first ID of the first electrical device. The gateway can also determine a first location of the first electrical device using the first strength and the first ID of the first electrical device.

18 Claims, 12 Drawing Sheets

US 11,408,967 B2

LOCATION OF DEVICES USING LOW BANDWIDTH COMMUNICATION PROTOCOLS IN A MESH NETWORK

This application claims priority under 35 U.S.C. § 119 to U.S. Provisional Patent Application Ser. No. 62/720,563, titled "Location of Devices Using Low Bandwidth Communication Protocols In a Mesh Network" and filed on Aug. 21, 2018, the entire contents of which are hereby incorporated herein by reference.

TECHNICAL FIELD

Embodiments described herein relate generally to locating devices in a space, and more particularly to systems, methods, and devices for locating devices in a space using a low bandwidth communication protocols in a mesh network.

BACKGROUND

Different methods are used to locate a device within a volume of space. Many of these methods use point-to-point communication protocols and/or high bandwidth communication protocols. Regardless of the locating method in use, a considerable amount of processing effort is currently put into determining the precise location of a device.

SUMMARY

In general, in one aspect, the disclosure relates to a system for locating a plurality of electrical devices in a volume of space. The system can include a first electrical device of the plurality of electrical devices disposed in the volume of space and including a first controller having a first transceiver, where the first transceiver sends a first signal using a first communication protocol. The system can also include a second electrical device of the plurality of electrical devices disposed in the volume of space, where the second electrical device includes a second controller having a second transceiver, where the second transceiver receives the first signal using the first communication protocol, where the second controller measures a first strength of the first signal, where the second controller generates a first table that includes the first strength and a first ID of the first electrical device, where the second transceiver sends a second signal using a second communication protocol. The system can further include a gateway communicably coupled to the second electrical device. The gateway can receive the second signal from the second electrical device, where the second signal includes the first strength, the first ID of the first electrical device, and a second ID of the second electrical device. The gateway can also determine a first location of the first electrical device in the volume of space using the first strength and the first ID of the first electrical device.

These and other aspects, objects, features, and embodiments will be apparent from the following description and the appended claims.

BRIEF DESCRIPTION OF THE DRAWINGS

The drawings illustrate only example embodiments of location of devices using low bandwidth communication protocols in a mesh network and are therefore not to be considered limiting of its scope, as location of devices using low bandwidth communication protocols in a mesh network may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
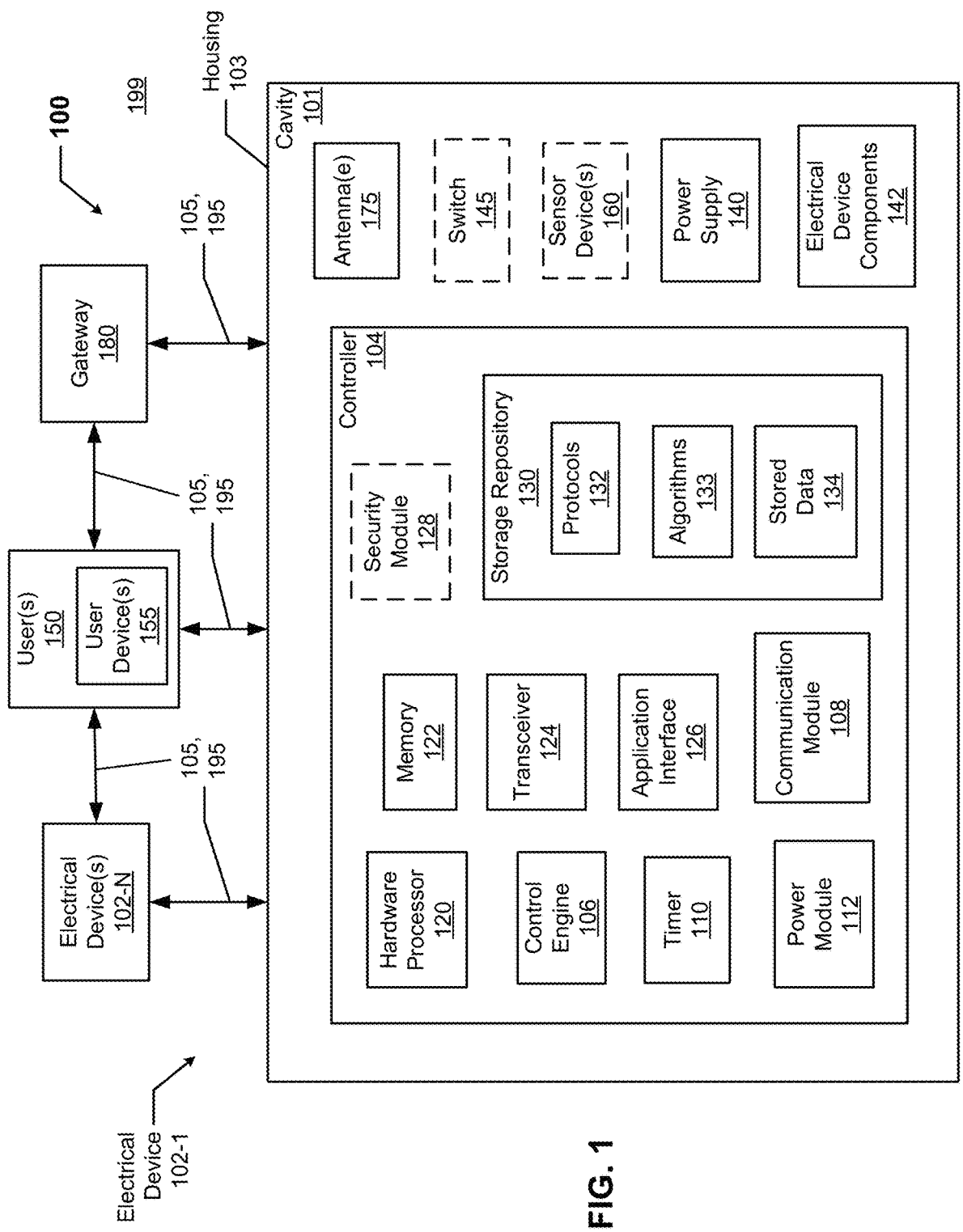
FIG. 1 shows a diagram of a system for locating devices using low bandwidth communication protocols in a mesh network in accordance with certain example embodiments.

The example embodiments discussed herein are directed to systems, methods, and devices for location of devices using low bandwidth communication protocols in a mesh network. Using such communication protocols can be used to locate a device (e.g., an electrical device, a beacon) in a volume of space in real time. The systems described herein can sometimes be referred to as a real-time location system (RTLS). While example embodiments are described herein as using electrical devices in the form of light fixtures (or components thereof) to locate one or more devices in a volume of space, example embodiments can use one or more of a number of other types of electrical devices in addition to, or as an alternative to, light fixtures. Such other types of electrical devices can include, but are not limited to, a light switch, a control panel, a wall outlet, a smoke detector, a sensor device (e.g., a $CO_2$ monitor, a motion detector, a broken glass sensor), and a camera.

Example embodiments can be used in any of a number of different applications. For instance, example embodiments can be used to locate a number of electrical devices in a volume of space. Such location can be an absolute location (in two or three dimensions) of an electrical device in the volume of space or proximity (in two or three dimensions) of one electrical device to another electrical device in the volume of space. In another instance, example embodiments can be used to commission one or more electrical devices in a volume of space. In yet another instance, example embodiments can be used to create multiple zones within a volume of space, where each zone includes one or more electrical devices. In this latter case, zones can be created to organize multiple electrical devices in terms of communications, operations, some other factor, or any suitable combination thereof. An electrical device can be in a fixed position (e.g., mounted to a ceiling or column) or mobile (e.g., attached to a forklift, integrated with a cart).

Example embodiments can be used for a volume of space having any size and/or located in any environment (e.g., indoor, outdoor, hazardous, non-hazardous, high humidity, low temperature, corrosive, sterile, high vibration). Further, while signals described herein are radio frequency (RF) signals using Zigbee, example embodiments can be used with any of a number of other types of signals (e.g., visible light communication, optical frequency) using any of a number of other types of communication protocols (e.g., Bluetooth, Bluetooth Low Energy, RuBee, 802.15.4 MAC, DASH7). Example embodiments can be used to locate an object in a volume of space in real time. Further, aside from mesh networks, example embodiments can be used with other types of networks (e.g., hub-and-spoke).

When electrical devices in example embodiments involve light fixtures, such light fixtures described herein can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source. As defined herein, an electrical device (including a light fixture) can be any unit or group of units. An electrical device can move on its own, is capable of being moved, or is stationary.

In certain example embodiments, light fixtures (or other electrical devices) used for location of devices using low bandwidth communication protocols in a mesh network are subject to meeting certain standards and/or requirements. For example, the National Electric Code (NEC), the National Electrical Manufacturers Association (NEMA), the International Electrotechnical Commission (IEC), Underwriters Laboratories (UL), the Federal Communication Commission (FCC), the Bluetooth Special Interest Group, and the Institute of Electrical and Electronics Engineers (IEEE) set standards that can be applied to electrical enclosures (e.g., light fixture housings), wiring, location services, and electrical connections. Use of example embodiments described herein meet (and/or allow a corresponding device to meet) such standards when required. In some (e.g., PV solar) applications, additional standards particular to that application may be met by the electrical devices described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of location of devices using low bandwidth communication protocols in a mesh network will be described more fully hereinafter with reference to the accompanying drawings, in which example embodiments of location of devices using low bandwidth communication protocols in a mesh network are shown. Location of devices using low bandwidth communication protocols in a mesh network may, however, be embodied in many different forms and should not be construed as limited to the example embodiments set forth herein. Rather, these example embodiments are provided so that this disclosure will be thorough and complete, and will fully convey the scope of location of devices using low bandwidth communication protocols in a mesh network to those of ordinary skill in the art. Like, but not necessarily the same, elements (also sometimes called components) in the various figures are denoted by like reference numerals for consistency.

Terms such as "first", "second", "outer", "inner", "top", "bottom", "on", and "within" are used merely to distinguish one component (or part of a component or state of a component) from another. Such terms are not meant to denote a preference or a particular orientation. Such terms are not meant to limit embodiments of location of devices using low bandwidth communication protocols in a mesh network. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 for locating devices using low bandwidth communication protocols in a mesh network in accordance with certain example embodiments. The system 100 can include one or more of a number of components. For example, the system 100 can include electrical device 102-1, one or more other electrical devices 102-N, one or more users 150, and a gateway 180. The electrical device 102-1 can include a controller 104, one or more antenna 175, an optional switch 145, one or more optional sensor devices 160, a power supply 140, and a number of electrical device components 142. The light fixture 102-1 is located in a volume of space 199. Similarly, one or more of the other light fixtures 102-N and the users 150 can be located in the volume of space 199. The gateway 180 can be located within or outside the volume of space 199.

The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128. One or more of the components (e.g., storage repository) of the electrical device 102-1 can also be included in one or more of the other electrical devices 102-N in the system 100. Alternatively, a component (e.g., the controller 104) shown in FIG. 1 can be a stand-alone component.

Collectively, electrical device 102-1 and the other electrical devices 102-N can be referred to as the electrical devices 102. One or more of the electrical devices 102 can be referred to as objects herein at times. The components shown in FIG. 1 are not exhaustive, and in some embodiments, one or more of the components shown in FIG. 1 may not be included in the example system 100. For instance, any component of the example electrical device 102-1 can be discrete or combined with one or more other components of the electrical device 102-1. For example, the timer 110 can be part of the control engine 106 of the controller 104.

A user 150 may be any person that interacts with one or more electrical devices 102 within a volume of space 199 in the system 100. Specifically, a user 150 may program, operate, and/or interface with one or more components (e.g., the controller 104, the gateway 180) associated with the system 100. Examples of a user 150 may include, but are not limited to, an engineer, an electrician, an instrumentation and controls technician, a mechanic, an operator, a consultant, a contractor, an asset, a gateway, and a manufacturer's representative.

The user 150 can use a user device 155 (also called a user system 155 herein), which may include a display (e.g., a GUI). The user 150 (including an associated user device 155) can interact with (e.g., sends data to, receives data from) the controller 104 of electrical device 102-1 via the application interface 126 (described below). The user 150 (including an associated user device 155) can also interact with the gateway 180. Interaction between the user 150 (including an associated user device 155), the electrical devices 102, and the gateway 180 is conducted using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI, 802.15.4 MAC, Zigbee) technology. For example, a communication link 105 can be (or include) one or more electrical conductors that are coupled to the housing 103 of the electrical device 102-1 and to the gateway 180. The communication links 105 can transmit signals 195 (e.g., communication signals, control signals, data, messages) between the electrical devices 102, a user 150 (including an associated user device 155), and/or the gateway 180.

The signals 195 that are transmitted between the electrical devices 102, the gateway 180, and a user device 155 of a user 150 can be any type of communication that can be used with wired or wireless technology. For example, the signals 195 can be RF signals that are used when the communication links 105 between the electrical devices 102 and the gateway 180 use wireless technology. In such a case, as discussed below, the controller 104 of each electrical device 102 and the gateway 180 can include one or more of a number of components (e.g., one or more antennae 175, one or more switches 145) to facilitate that wireless communication.

In certain example embodiments, each signal 195 sent by an electrical device 102 includes a UUID or other form of identification associated with that electrical device 102. In addition, each signal 195 sent by an electrical device 102 can include an address of the gateway 180 or another electrical device 102 to designate the recipient of the signal 195. Each signal 195 can also include other information, such as signal strength (e.g., −60 dBm, −69 dBm) of a signal 195 received by one electrical device 102 from another electrical device 102 in the system 100, and a time stamp of when the signal 195 was sent or received.

The gateway 180 is a device or component that controls, directly or indirectly, all or a portion of the system 100 that includes the controller 104 of the electrical device 102-1 and the controllers of the other electrical devices 102-N. The gateway 180 can be called by any of a number of other names, including but not limited to the master controller and the network manager. The gateway 180 can be substantially similar (e.g., in terms of components, in terms of functionality) to the controller 104. Alternatively, the gateway 180 can include one or more of a number of features in addition to, or altered from, the features of the controller 104 described below.

The gateway 180 is configured to send signals 195 to and receive signals 195 from, directly or indirectly, all of the electrical devices 102 in the system 100. In certain example embodiments, the gateway 180 receives (directly or indirectly) one or more signals 195 from each electrical device 102, where each such signal 195 includes signal strength information (e.g., RSSI value) of all of the signals 195 received by that electrical device 102, an identification of each of those electrical devices 102, and a time stamp of each of the signals 195. In this way, the gateway 180 can use the various signal strength information from all electrical devices 102 to determine the location of all electrical devices 102 in the volume of space 199 within the system 100. If one of the electrical devices 102 moves within the volume of space 199, then the gateway 180 can track the new location of that electrical device 102 within the volume of space 199 in real time.

The controller of the gateway 180 can use one or more protocols 132 and/or algorithms 133 (both part of the storage repository 130) to determine the location of the one or more electrical devices 102 based on the signal strength information contained by the various signals 195 received by the gateway 180. Such location can be an absolute location (in two or three dimensions) of an electrical device 102 in the volume of space 199 or proximity (in two or three dimensions) of one electrical device 102 to one or more other electrical devices 102 in the volume of space 199.

As another example, the controller of the gateway 180 can use the information (signal strength, identification, time stamp) from one or more tables (discussed below) maintained by one or more of the electrical devices 102 and provided to the gateway 180 by those electrical devices 102 using signals 195 to assign particular electrical devices 102 to a group or area within the volume of space 199. These assignments can be used for commissioning and/or operations of the electrical devices 102. For example, when preparing to commission a group or area of electrical devices 102, the gateway 180 can send one or more signals to the electrical devices 102 in the group or area with instructions for commissioning. As another example, during operations, the gateway 180 can send one or more signals to the electrical devices 102 in the group or area with instructions, settings, and/or parameters for operating.

As a more specific example, the controller of the gateway 180 can commission one or more electrical devices 102 in the volume of space 199 using the location of the electrical devices 102 derived from the signal strengths. As yet another example, the controller of the gateway 180 can create multiple zones within the volume of space 199, where each zone includes one or more electrical devices 102 and is based on the location of those electrical devices 102 determined using example embodiments. In such a case, zones can be created to organize multiple electrical devices 102 in terms of communications, operations, some other factor, or any suitable combination thereof.

A user 150 (including an associated user device 155), the gateway 180, and/or any other applicable electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to a user 150 (including an associated user device 155), the controller 104 of another electrical device 102-N, and/or the gateway 180. A user 150 (including an associated user device 155), the other electrical devices 102-N, and the gateway 180 can include an interface to receive data from and send data to the controller 104 in certain example embodiments. Examples of such an interface can include, but are not limited to, a graphical user interface, a touch-screen, an application programming interface, a keyboard, a monitor, a mouse, a web service, a data protocol adapter, a communication module (similar to the communication module 108 discussed below), some other hardware and/or software, or any suitable combination thereof.

The controller 104, a user 150 (including an associated user device 155), the other electrical devices 102-N, and the gateway 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, gateway software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment). For example, if the electrical device 102-1 is located in an explosive environment, the housing 103 can be explosion-proof.

The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the power supply 140, the one or more antenna 175, the optional switch 145, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with a user 150 (including an associated user device 155), the gateway 180, and any other applicable electrical devices 102-N within the system 100. In one or more example embodiments, the storage repository 130 stores one or more protocols 132, one or more algorithms 133, and stored data 134. The protocols 132 can be any procedures (e.g., a series of method steps) and/or other similar operational procedures that the control engine 106 of the controller 104 follows based on certain conditions at a point in time.

The protocols 132 can also include any of a number of communication protocols (e.g., Zigbee, 802.15.4 MAC) that are used to send and/or receive data between the controller 104 and a user 150 (including an associated user device 155), the gateway 180, and any other applicable electrical devices 102-N. One or more of the protocols 132 can be a time-synchronized communication protocol. Examples of such time-synchronized communication protocols can include, but are not limited to, a highway addressable remote transducer (HART) protocol, a wirelessHART protocol, and an International Society of Automation (ISA) 100 protocol. In this way, one or more of the protocols 132 used for communication can provide a layer of security to the data transferred within the system 100.

The algorithms 133 can be any models, formulas, and/or other similar operational implementations that the control engine 106 of the controller 104 uses. For example, the storage repository 130 can include an algorithm 133 to determine the distance of another electrical device 102-N from the electrical device 102-1 based on a strength of a signal 195 received by the electrical device 102-1 from the other electrical device 102-N. An algorithm 133 can at times be used in conjunction with one or more protocols 132.

Stored data 134 can be any past, current, and/or forecast data associated with implementing example embodiments. For example, any table established and maintained by the control engine 106 can be part of the stored data 134. Each such table can include data (e.g., identification of another electrical device 102, the strength of a signal 195 received from another electrical device 102, time stamp as to when a particular signal 195 was received) used by the gateway 180 to determine a location of the other electrical device 102 in the volume of space 199 and/or to determine whether a record in the table should be retained or discarded. Other data that can be stored in the storage repository 130 as stored data can include, but is not limited to, a manufacturer of the electrical device 102-1, a model number of the electrical device 102-1, communication capability of the transceiver 124, and age of the electrical device 102-1. The storage repository 130 can also include other types of data, including but not limited to threshold values, ranges of acceptable values, user preferences, default values, user preferences, results of an algorithm 133, and configuration of the antennae 175.

Examples of a storage repository 130 can include, but are not limited to, a database (or a number of databases), a file system, a hard drive, flash memory, cloud-based storage, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with a user 150 (including an associated user device 155), the gateway 180, and any other applicable electrical devices 102-N in the system 100. More specifically, the control engine 106 sends information to and/or receives information from the storage repository 130 in order to communicate with a user 150 (including an associated user device 155), the gateway 180, and any other applicable electrical devices 102-N. As discussed below, the storage repository 130 can also be operatively connected to the communication module 108 in certain example embodiments.

In certain example embodiments, the control engine 106 of the controller 104 controls the operation of one or more other components (e.g., the communication module 108, the timer 110, the transceiver 124) of the controller 104. For example, the control engine 106 can put the communication module 108 in "sleep" mode when there are no communications between the controller 104 and another component (e.g., another electrical device 102-N, a user device 155 of a user 150) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to receive, using one or more of the antennae 175, signals 195 from one or more other electrical devices 102-N in the system 100. This example provides another instance where the control engine 106 can conserve power used by the controller 104 and other components (e.g., one or more other light fixtures 102-N) of the system 100.

The control engine 106 of the controller 104 can initiate and maintain communications with one or more of the other electrical devices 102-N. To initiate and maintain such communications, the control engine 106 uses the transceiver 124 and the communication module 108 to send and receive signals 195 with the other electrical devices 102-N. The control engine 106 can determine when to receive one or more signals 195 to communicate with one or more other electrical devices 102-N. To conserve energy, the control engine 106 does not constantly receive signals 195, but rather only does so at discrete times. The control engine 106 can be active to receive a signal 195 based on one or more of a number of factors, including but not limited to passage of time, the occurrence of an event, instructions from a user 150 (including an associated user device 155), and a command received from the gateway 180. Alternatively, the control engine 106 can be on at all times.

The control engine 106 of the controller 104 can determine the strength of each signal 195 received by the transceiver 124. The control engine 106 of the controller 104 can also determine the relative strength of one signal 195 relative to another signal 195. The control engine 106 of the controller 104 can further determine a time at which each signal 195 is sent or received. The control engine 106 of the controller 104 can also establish, populate, and maintain one or more tables (part of the stored data 134 of the storage repository 130) using information contained in and/or associated with the various signals 195 received from the gateway 180 and/or other electrical devices 102. For example, the control engine 106 can establish a table or series of tables that is populated with the strength of each signal 195 received, where the strength of each signal 195 is attributed to the identification of a particular electrical device 102 or the gateway 180 that sent the associated signal 195. The control engine 106 can also populate that table with the age (e.g., a time stamp of when a signal 195 was received) of each signal 195.

In such a case, the control engine 106 of the controller 104 can update these tables in any of a number of ways. For example, each time the control engine 106 receives (through the transceiver 124) a signal 195 from a particular electrical device 102 or the gateway 180, the control engine 106 updates the table by replacing the previous information in the table that is associated with that particular electrical device 102 or the gateway 180 with the newly received information (e.g., signal strength, time stamp). As another example, if a certain amount of time (e.g., as measured by the timer 110) has elapsed since the control engine 106 has received a signal 195 from a particular electrical device 102 or the gateway 180, then the control engine 106 can remove all of the information in the table associated with that particular electrical device 102 or the gateway 180. In other words, if an entry in the table is deemed to be too old, the control engine 106 may clear that entry.

The control engine 106 of the controller 104 can also generate signals 195 and broadcast, using the transceiver 124, those signals 195. The signals 195 that are generated by the control engine 106 can include any information stored in the tables maintained by the control engine 106. For example, the control engine 106 can send, in one or more signals 195, the signal strength, associated identification, and time stamp, as stored in a table, for one or more other electrical devices 102. In such a case, the signal 195 that includes the signal strength of one or more other electrical devices 102 and/or the timestamp associated with that signal strength can be addressed to the gateway 180. Because of the mesh network configuration of the system 100, such a signal 195 will be delivered to the gateway 180, whether directly or indirectly.

In some cases, the information stored in a table by the control engine 106 exceeds the maximum size (e.g., in bytes) of a signal 195 in a particular communication protocol (e.g., Zigbee). This is particularly true with communication protocols (e.g., Zigbee) associated with higher layers in a system, as those higher layers have a low bandwidth. In such a case, the control engine 106 can determine the size of a table and, when the size exceeds a threshold value (e.g., represented by a maximum size of a signal 195), then the control engine 106 can divide the information in a table and create multiple signals 195 so that the entire contents of the table can be communicated.

The control engine 106 can also receive information provided in signals 195 received from the gateway 180. For example, if the gateway 180 determines that a particular electrical device 102 has moved away from a part of the volume of space 199 occupied by electrical device 102-1, the gateway 180 can proactively send a signal 195 to the electrical device 102-1 informing the control engine 106 that any table being maintained by the control engine 106 can remove information (e.g., signal strength, associated identification, time stamp) associated with that particular electrical device 102.

As another example, the gateway 180 can send one or more signals 195 to the electrical device 102-1 that include instructions, settings, and/or other parameters associated with commissioning and/or operation of the electrical device 102-1. Specifically, when the electrical device 102-1 is assigned to a particular group of electrical devices 102 or area within the volume of space 199 by the gateway 180, certain instructions, settings, and/or other parameters can apply to the electrical device 102-1 by virtue of its assigned group or area. The control engine 106 can provide control, communication, and/or other types of signals 195 to a user 150 (including an associated user device 155), the gateway 180, and the other electrical devices 102-N. Similarly, the control engine 106 can receive control, communication, and/or other types of signals 195 from a user 150 (including an associated user device 155), the gateway 180, and the other electrical devices 102-N. The control engine 106 can communicate with each other electrical device 102-N automatically (for example, based on one or more algorithms stored in the storage repository 130) and/or based on control, communication, and/or other similar signals received from another component (e.g., the gateway 180) using the signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and a user 150 (including an associated user device 155), the gateway 180, and any other applicable electrical devices 102-N.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

Using example embodiments, while at least a portion (e.g., the control engine 106, the timer 110) of the controller 104 is always on, the remainder of the controller 104 can be in sleep mode when they are not being used. In addition, the controller 104 can control certain aspects (e.g., sending signals 195 to and receiving signals 195 from one or more other electrical devices 102-N, operating an optional switch 145) of one or more other applicable electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and a user 150 (including an associated user device 155), the gateway 180, and any other applicable electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) a user 150 (including an associated user device 155), the gateway 180, and/or any other applicable electrical devices 102-N. In some cases, the communication module 108 accesses the stored data 134 to determine which protocol 132 for communication is within the capability of one or more other electrical devices 102-N for a signal 195 sent by the control engine 106. In addition, the communication module 108 can interpret the communication protocol of a communication (e.g., a signal 195) received by the controller 104 so that the control engine 106 can interpret the communication.

The communication module 108 can send data (e.g., protocols 132, stored data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure multiple times simultaneously. The timer 110 can track time periods based on an instruction received from the control engine 106, based on an instruction received from the user 150, based on an instruction programmed in the software for the controller 104, based on some other condition or from some other component, or from any combination thereof.

For example, the timer 110 can set delays in when signals are sent by the control engine 106 so that the various signals sent and received within the system 100 are not synchronized with each other, which helps avoid one or more signals being ignored or superseded. As another example, the timer 110 can measure a period of time that has elapsed since a table or part of a table has been updated. The timer 110 can also measure an amount of time that has passed since a particular signal 195 was received from another electrical device 102. If the period of time exceeds a threshold value, then the control engine 106 can clear the table or part of the table. Such can be the case when another electrical device 102 that had been in communication with the electrical device 102-1 but for some reason (e.g., the other electrical device 102 has moved, the other electrical device 102 has stopped functioning) is no longer in communication with the electrical device 102-1.

The power module 112 of the controller 104 provides power to one or more other components (e.g., timer 110, control engine 106) of the controller 104. In addition, in certain example embodiments, the power module 112 can provide power to the power supply 140 of the electrical device 102-1. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102-1 and generates power of a type (e.g., alternating current, direct current) and level (e.g., 12V, 24V, 120V) that can be used by the other components of the controller 104 and/or by the power supply 140. In addition, or in the alternative, the power module 112 can be or include a source of power in itself to provide signals to the other components of the controller 104 and/or the power supply 140. For example, the power module 112 can be or include a battery. As another example, the power module 112 can be or include a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by a user 150 (including an associated user device 155), and the gateway 180, and/or any other applicable electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals, including signals 195. Specifically, the transceiver 124 can be used to transfer data between the controller 104 and a user 150 (including an associated user device 155), the gateway 180, and/or any other applicable electrical devices 102-N. The transceiver 124 can use wired and/or wireless technology. The transceiver 124 can be configured in such a way that the control and/or communication signals sent and/or received by the transceiver 124 can be received and/or sent by another transceiver that is part of a user 150 (including an associated user device 155), the gateway 180, and/or any other applicable electrical devices 102-N.

In certain example embodiments, the transceiver 124 of the controller 104 is configured to measure the signal strength (e.g., using Received Signal Strength Indication (RSSI)) of each communication (signal 195) received by the controller 104. Alternatively, some other component (e.g., the control engine 106) of the controller 104 can be used to measure the signal strength of each signal 195 received by the controller 104. In such a case, the signal strength of a communication can be measured in any of a number of ways, whether now known or developed in the future, using any equipment, whether now known or developed in the future. Alternatively, some other component of the electrical device 102-1 (e.g., a sensor device 160, circuitry included in an antenna 175) can be used to measure the signal strength of each communication received by the transceiver 124.

When the transceiver 124 uses wireless technology, any type of wireless technology can be used by the transceiver 124 in sending and receiving signals. Such wireless technology can include, but is not limited to, Zigbee, 802.15.4 MAC, Wi-Fi, visible light communication, cellular networking, Bluetooth, and BLE. The transceiver 124 can use one or more of any number of suitable communication protocols (e.g., ISA100, HART) when sending and/or receiving signals, including signals 195. Such communication protocols can be stored in the protocols 132 of the storage repository 130. Further, any transceiver information for a user system 155 of a user 150, the gateway 180, and/or any other applicable electrical devices 102-N can be part of the stored data 134 (or similar areas) of the storage repository 130.

Optionally, in one or more example embodiments, the security module 128 secures interactions between the controller 104, a user 150 (including an associated user device 155), the gateway 180, and/or any other applicable electrical devices 102-N. More specifically, the security module 128 authenticates communication from software based on security keys verifying the identity of the source of the communication. For example, user software may be associated with a security key enabling the software of a user device 155 of a user 150 to interact with the controller 104 of the electrical device 102-N. Further, the security module 128 can restrict receipt of information, requests for information, and/or access to information in some example embodiments.

As mentioned above, aside from the controller 104 and its components, the electrical device 102-1 can include a power supply 140, one or more antennae 175, an optional switch 145, and one or more electrical device components 142. The electrical device components 142 of the electrical device 102-1 are devices and/or components typically found in an electrical device to allow the electrical device 102-1 to operate. An electrical device component 142 can be electrical, electronic, mechanical, or any combination thereof. The electrical device 102-1 can have one or more of any number and/or type of electrical device components 142. For example, if the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 provides power to the controller 104, the optional switch 145, an antenna 175, and/or one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The electrical device 102-1 can include one or more optional sensor devices 160. A sensor device 160 can include a sensor and one or more other components. Each sensor of a sensor device 160 can measure one or more parameters. The parameters measured by a sensor of a sensor device 160 may or may not directly affect the operation of the electrical device 102-1 or the other electrical devices 102-N. The parameters can include, but are not limited to, a strength of a signal 195, pressure, temperature, carbon monoxide, ambient light, sound, motion, carbon dioxide, smoke, and humidity.

Examples of types of sensor devices 160 can include, but are not limited to, a passive infrared sensor, a photocell, a signal strength indicator, a differential pressure sensor, a humidity sensor, a pressure sensor, an air flow monitor, a gas detector, a vibration sensor, and a resistance temperature detector. Each sensor device 160 can use one or more of a number of communication protocols. A sensor device 160 can be associated with the electrical device 102-1 and/or one or more other electrical devices 102-N in the system 100.

In addition to at least one sensor, a sensor device 160 can include one or more of a number of components. For example, a sensor device 160 can include a controller (or components thereof) that is substantially similar to the controller 304 (or components thereof) of the electrical device 102-1, as described below. For example, if a sensor device 160 has communication capabilities, then the sensor device 160 can use one or more of a number of communication protocols. A sensor device 160 can be associated with the electrical device 102-1 and/or one or more other electrical devices 102-N in the system 100.

The power supply 140 can include one or more components (e.g., a transformer, a diode bridge, an inverter, a converter) that receives power (for example, through an electrical cable) from or sends power to the power module 112 of the controller 104. The power supply 140 can generate, based on power that it receives, power of a type (e.g., alternating current, direct current) and level (e.g., 12V, 24V, 120V) that can be used by the recipients (e.g., the electrical device components 142, a sensor device 160, the controller 106) of such power. In addition, or in the alternative, the power supply 140 can receive power from a source external to the electrical device 102-1. In addition, or in the alternative, the power supply 140 can be or include a source of power in itself. For example, the power supply 140 can be or include a battery, a localized photovoltaic power system, or some other source of independent power.

As discussed above, the electrical device 102-1 includes one or more antennae 175. An antenna 175 is an electrical device that converts electrical power to signals 195 (for transmitting) and signals 195 to electrical power (for receiving). In transmission, a radio transmitter (e.g., transceiver 124) supplies, directly or through the optional switch 145, an electric current oscillating at radio frequency (i.e. a high frequency alternating current (AC)) to the terminals of the antenna 175, and the antenna 175 radiates the energy from the current as signals 195. In reception, an antenna 175 intercepts some of the power of signals 195 in order to produce a tiny voltage at its terminals, where the voltage is applied through the switch 145 to a receiver (e.g., transceiver 124) to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse signal 195 (often an electromagnetic field wave). Conversely, during reception, the oscillating electric and magnetic fields of an incoming signal 195 create oscillating currents in the antenna 175.

In certain example embodiments, an antenna 175 can be disposed at, within, or on any portion of the electrical device 102-1. For example, an antenna 175 can be disposed on the housing 103 of the electrical device 102-1 and extend away from the electrical device 102-1. As another example, an antenna 175 can be insert molded into a lens of the electrical device 102-1. As another example, an antenna 175 can be two-shot injection molded into the housing 103 of the electrical device 102-1. As yet another example, an antenna 175 can be adhesive mounted onto the housing 103 of the electrical device 102-1. As still another example, an antenna 175 can be pad printed onto a circuit board within the cavity 101 formed by the housing 103 of the electrical device 102-1. As yet another example, an antenna 175 can be a chip ceramic antenna that is surface mounted. As still another example, an antenna 175 can be a wire antenna.

An antenna 175 can be electrically coupled to the optional switch 145, which in turn is electrically coupled to the transceiver 124. Without the switch 145, an antenna 175 is directly electrically coupled to the transceiver 124. The optional switch 145 can be a single switch device or a number of switch devices arranged in series and/or in parallel with each other. The switch 145 determines which antenna 175 (in the case of multiple antennae 175) or when the lone antenna 175 is coupled to the transceiver 124 at any particular point in time.

A switch 145 can have one or more contacts, where each contact has an open state and a closed state (position). In the open state, a contact of the switch 145 creates an open circuit, which prevents the transceiver 124 from delivering a signal 195 to or receiving a signal 195 from the antenna 175 electrically coupled to that contact of the switch 145. In the closed state, a contact of the switch 145 creates a closed circuit, which allows the transceiver 124 to deliver a signal 195 to or receive a signal 195 from the antenna 175 electrically coupled to that contact of the switch 145. In certain example embodiments, the position of each contact of the optional switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
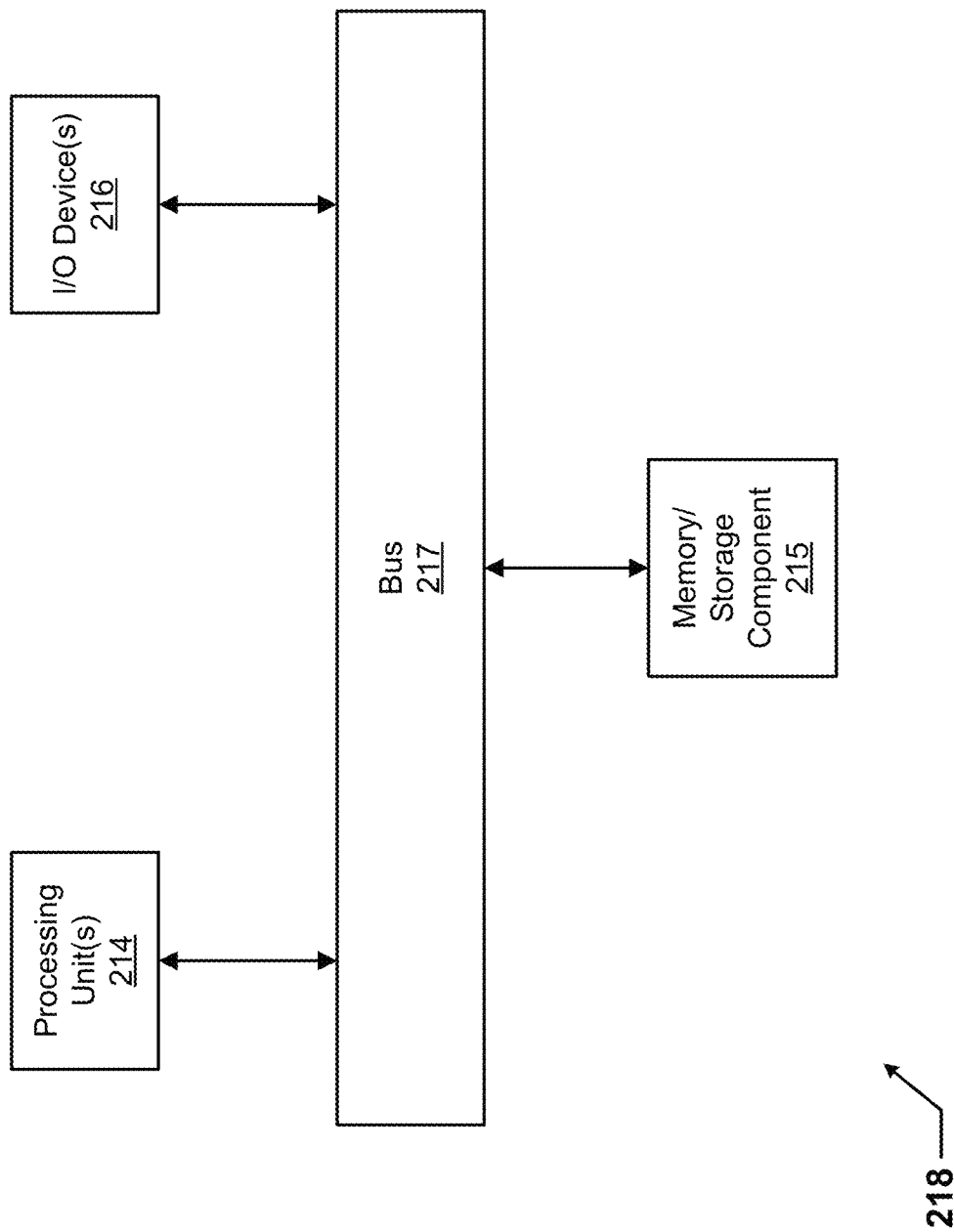
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102-1 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
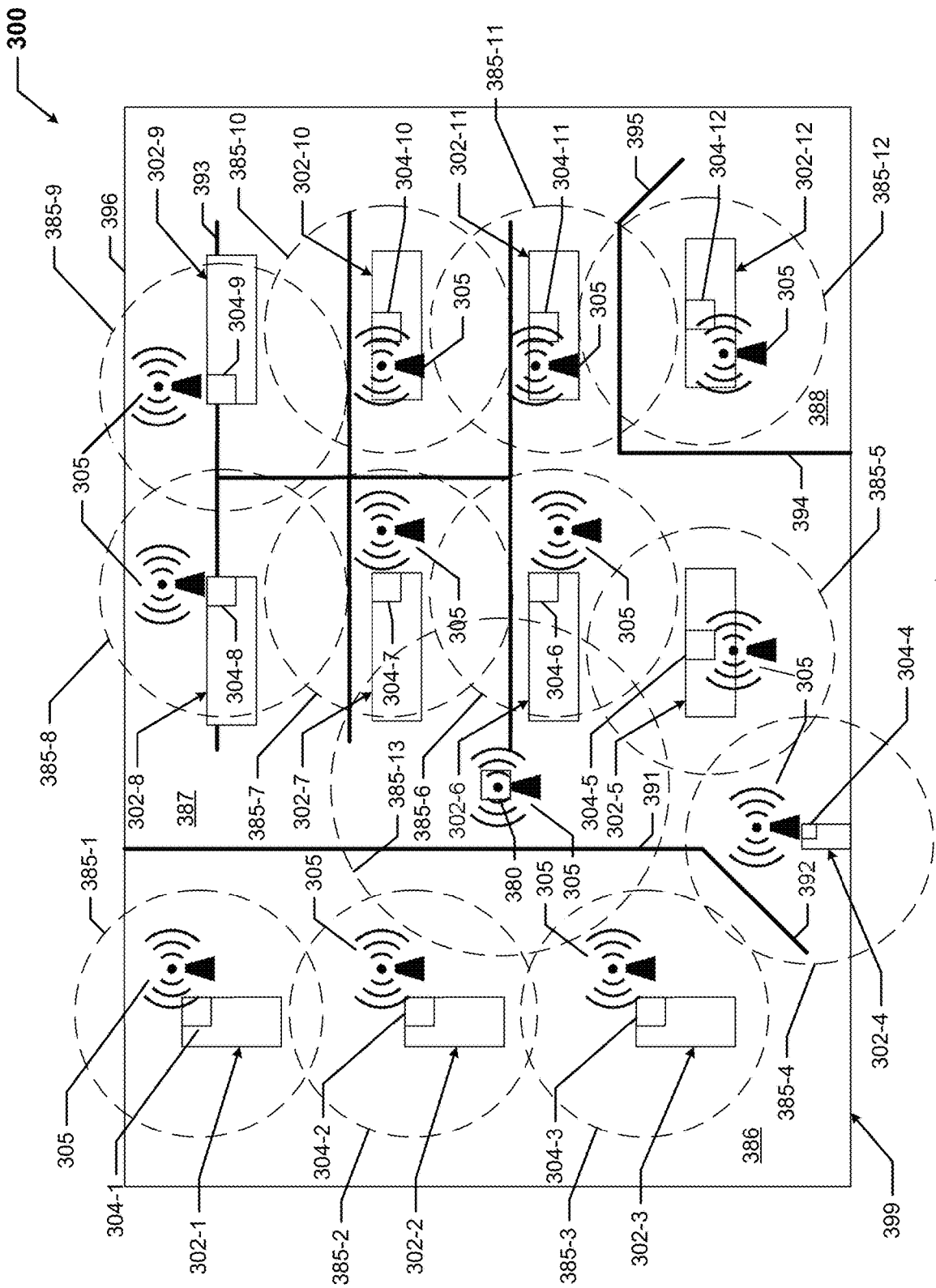
FIG. 3 shows a system located in a volume of space in accordance with certain example embodiments.

FIG. 3 shows a system 300 located in a volume of space 399 in accordance with certain example embodiments. In this case, the system 300 includes twelve electrical devices 302, where each electrical device 302 shown in FIG. 3 is a light fixture. Specifically, the system 300 includes electrical device 302-1, electrical device 302-2, electrical device 302-3, electrical device 302-4, electrical device 302-5, electrical device 302-6, electrical device 302-7, electrical device 302-8, electrical device 302-9, electrical device 302-10, electrical device 302-11, and electrical device 302-12. In this case, electrical device 302-4 is an exit light, and the other 11 electrical devices 302 are troffer lights. The system 300 of FIG. 3 also includes a gateway 380 disposed in the volume of space 399. While not shown in FIG. 3 to simplify the figure, to the extent that there are other electrical devices 302 (e.g., electrical outlets, cameras, projectors, sensor devices) in the volume of space 399, they can also include a controller with a transceiver.

The volume of space 399 is broken down into multiple areas. Specifically, the volume of space 399 includes a hallway 386, a workspace 387, and an office 388. Electrical device 302-1, electrical device 302-2, and electrical device 302-3 are located in the hallway 386. Electrical device 302-4, electrical device 302-5, electrical device 302-6, electrical device 302-7, electrical device 302-8, electrical device 302-9, electrical device 302-10, electrical device 302-11, and the gateway 380 are located in the workspace 387. Electrical device 302-12 is located in the office 388.

Each electrical device 302 in the system 300 of FIG. 3 includes a controller 304. Specifically, in this example, electrical device 302-1 includes controller 304-1, electrical device 302-2 includes controller 304-2, electrical device 302-3 includes controller 304-3, electrical device 302-4 includes controller 304-4, electrical device 302-5 includes controller 304-5, electrical device 302-6 includes controller 304-6, electrical device 302-7 includes controller 304-7, electrical device 302-8 includes controller 304-8, electrical device 302-9 includes controller 304-9, electrical device 302-10 includes controller 304-10, electrical device 302-11 includes controller 304-11, and electrical device 302-12 includes controller 304-12. As discussed above with respect to FIG. 1, the gateway 380 can also include its own controller.

As shown in FIG. 3, the location of the controller 304 on each electrical device 302 can vary. Further, each controller 304 includes a transceiver (e.g., transceiver 124), and each transceiver in this example transmits and receives signals (e.g., signals 195). These signals are transmitted using the communication links 305 by which the electrical devices 302 (and, more specifically, the controllers 304) and the gateway 380 communicate with each other. Each transceiver of a controller 304 has a range 385 (e.g., 10 meters) that defines a maximum area or volume of space 399 in which the transceiver can send and receive signals.

In this case, the transceiver of controller 304-1 has range 385-1, the transceiver of controller 304-2 has range 385-2, the transceiver of controller 304-3 has range 385-3, the transceiver of controller 304-4 has range 385-4, the transceiver of controller 304-5 has range 385-5, the transceiver of controller 304-6 has range 385-6, the transceiver of controller 304-7 has range 385-7, the transceiver of controller 304-8 has range 385-8, the transceiver of controller 304-9 has range 385-9, the transceiver of controller 304-10 has range 385-10, the transceiver of controller 304-11 has range 385-11, the transceiver of controller 304-12 has range 385-12, and the transceiver of the controller of the gateway 380 has range 385-13.

A transceiver of a controller 304 of an electrical device 302 or the gateway 380 can communicate with a transceiver of a controller 304 of another electrical device 302 or the gateway 380 if the range 385 of one transceiver intersects with the range 385 of another transceiver. In this example, range 385-1 intersects range 385-2, which intersects range 385-3, which intersects range 385-4, which intersects range 385-5, which intersects range 385-6, which intersects range 385-7, which intersects range 385-8, which intersects range 385-9, which intersects range 385-10, which intersects range 385-11, which intersects range 385-12. In other words, the controllers 304 of the electrical devices 302 of FIG. 3 are communicably coupled to each other in a daisy-chain configuration.

In other embodiments, the range 385 of the transceiver of the controller 304 of one electrical device 302 can intersect with more than two ranges 385 of the transceivers of the controllers 304 of one or more other electrical device 302. Further, the range 385-13 of the gateway 380 intersects with the range 385-2 of electrical device 302-2, range 385-3 of electrical device 302-3, range 385-5 of electrical device 302-5, range 385-6 of electrical device 302-6, and range 385-7 of electrical device 302-7.

As discussed above, the electrical devices 302 and the gateway 380 of the system 300 of FIG. 3 are located within a volume of space 399. In this case, the volume of space 399 is part of an office space that is defined by exterior walls 396 that form the outer perimeter of the volume of space 399. The volume of space 399 is divided into a number of areas. For example, a wall 391 and a door 392 separate the hallway 386 (in which electrical device 302-1, electrical device 302-2, and electrical device 302-3 are located) from the workspace 387 (in which the gateway 380 and the electrical devices 302-4 through electrical device 302-11 are located). Electrical device 302-4, the exit sign, is located above the door 392 within the workspace 387.

As another example, wall 394 and door 395 define the office 388 (in which electrical device 302-12 is located) adjacent to the workspace 387. The workspace 387, the hallway 386, and the office 388 can be examples of zones that can be created by the controller of the gateway 380 based on the location and proximity information derived from the various signal strengths received by the controller of the gateway 380 from the various electrical devices 302 in communication with each other. A number of cubicle walls 393 are located within the workspace 387. The communication links 305, as in this case using the signals, can be capable of having a range 385 that extend beyond a wall or other boundary within the volume of space 399.

In some cases, one or more items within the volume of space 399 (e.g., signs, file cabinets, ductwork, or other devices having reflective material) can be located within a range 385. Such devices can interfere with communications between electrical devices 302 and/or the gateway 380 by altering and/or redirecting the signals sent between electrical devices 302 and/or the gateway 380. To overcome this obstacle, example embodiments can utilize one or more methods. For example, a controller 304 of a electrical device 302 can vary the frequencies of the signals (in this case, RF waves) that are sent.

The example controllers 304 of FIG. 3 (including the controller of the gateway 380) can measure, track, and communicate the strength of signals 195 received from adjacent electrical devices 302 in the system 300. For example, each electrical device 302 can have a unique identification number (part of the stored data 134), and when an electrical device 302 sends a signal 195, the unique identification number of that electrical device 302 is included in the signal 195. On occasion (e.g., at regular time intervals, randomly, based on some condition), the example controller 304 of each electrical device 302 can broadcast signals 195 that include its unique identification number and information (e.g., strengths of signals 195 received from other electrical devices 302, associated identifications, and time stamps of those received signals 195) from tables described above over the communication links 305 (e.g., a radio channel of known frequency). In some cases, such signals 195 with the table information described herein are addressed to the gateway 380.

Due to the mesh network structure of the system 300, the controller 304 of all other electrical devices 302 (and, in some cases, the gateway 380) that are within the range 385 of the broadcasting electrical device 302 receives the broadcast signal 195. When a signal 195 is specifically addressed to the gateway 380, the intermediary electrical devices 302 merely pass along the signal 195 (rather than open the signal 195 and access the information contained therein).

Upon receiving the broadcast signal 195, the controller 304 of the one or more receiving electrical devices 302 (and, in some cases, the gateway 380) measures the strength of that signal 195. Upon receiving the broadcast signal 195, the controller 304 of the one or more receiving electrical devices 302 (and, in some cases, the gateway 380) stores the various information (e.g., UUID, signal strength, time stamp) associated with or contained in the signal 195 in a table.

These signals 195 that are broadcast by the various controllers 304 can involve a number of different communication protocols (e.g., Inter-PAN), and each of these communication protocols can involve multiple layers. For example, when Inter-PAN is the communication protocol being used, there can be a 802.15.4 MAC at the data link layer, and Zigbee at one or more higher layers (e.g., network layer, application layer). In the current art, the information contained in the data link or physical layers (e.g., using 802.15.4 MAC) is not used at the higher layers (e.g., using Zigbee). By contrast, in example embodiments, signal strength information that is captured in the lower layers (e.g., using 802.15.4 MAC) is shared with the higher layers (e.g., using Zigbee) to create new tables or revise existing tables in those higher layers.

With each signal 195 received by a controller 304 of a electrical device 302, a table is populated with information extracted from the signal 195. Such information includes the identification number of the electrical devices 302 sending the communication and the strength of the signal 195. If an electrical device 302 receives a signal 195 that is addressed to the gateway 380, then that electrical device 302 forwards the signal 195 onward in the system 300 until the signal 195 eventually is received by the gateway 380.

When the controller 304 of an electrical device 302 receives a signal 195 from another electrical device 302, the controller 304 measures the strength of the signal 195 and updates at least one table recording the strength of the signal 195 and the electrical devices 302 that sent the signal 195. Such a signal can be addressed to that electrical device 302, to another electrical device 302, and/or to the gateway 380.

The overlap of ranges 385 of the transceivers 124 can be altered by adjusting one or more of a number of factors. For example, the electrical devices 302 can be placed relatively close to each other. As another example, which can be in conjunction with or independent of the previous example, the range 385 of one or more transceivers 124 can be increased or decreased.

Ultimately, all of the various signals 195 that include information about the signal strength of all of the electrical devices (in this case, electrical device 302-1 through electrical device 302-12) in the volume of space 399 are received by the gateway 380. In order to determine the location of the electrical devices 302 in the volume of space, the gateway 380 using one or more algorithms stored in the storage repository of the gateway 380. The information contained in the signals 195 received by the gateway 380 can be stored in tables in the storage repository of the gateway 380, and these tables can be continually updated by the gateway 380 as the information in the signals 195 changes. In some cases, the procedure for identifying and determining the location of electrical devices 302 in the volume of space 399 can be re-run based on some factor (e.g., passage of time, instructions from a user 150, loss of power to a electrical device 302 in the system 300).

As discussed above, example embodiments can be used for purposes other than simply locating electrical devices in the volume of space 399. For example, if a new electrical device 302 is added a year after the system 300 of FIG. 3 was previously commissioned, then the exact location of the new electrical device 302 can be identified, and the new electrical device 302 can be automatically commissioned by the gateway 380 or another electrical device 302 using example embodiments. Similarly, if an electrical device 302 is replaced with a replacement electrical device 302, then the exact location of the replacement electrical device 302 can be identified, and the replacement electrical device 302 can be commissioned by the gateway 380 or another electrical device 302 using example embodiments.

Figure 4:
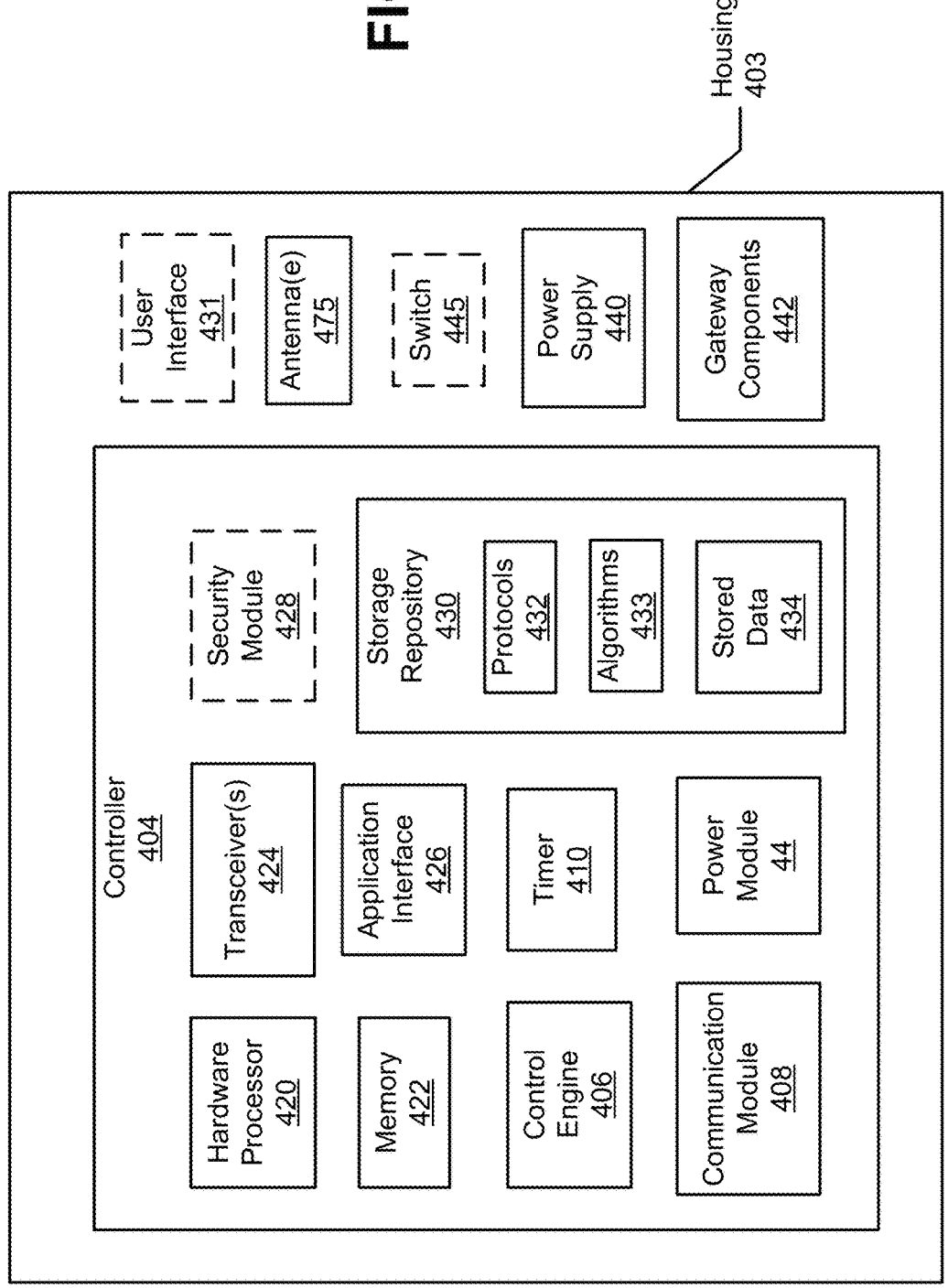
FIG. 4 shows a diagram of an integrated sensor module in accordance with certain example embodiments.

FIG. 4 shows a diagram of a gateway 480 in accordance with certain example embodiments. Referring to FIGS. 1 through 4, the gateway 480 of FIG. 4 can include one or more of a number of components. Such components, can include, but are not limited to, a controller 404 (which can include, for example, a control engine 406, a communication module 408, a timer 410, a power module 44, a storage repository 430, a hardware processor 420, a memory 422, one or more transceivers 424, an application interface 426, and, optionally, a security module 428), one or more optional user interfaces 431, one or more antennae 475, one or more optional switches 445, a power supply 440, and one or more gateway components 442.

The gateway 480 of FIG. 4 is a more detailed example of the gateway 180 described above with respect to FIG. 1. The components shown in FIG. 4 are not exhaustive, and in some embodiments, one or more of the components shown in FIG. 4 may not be included in an example gateway 480. Any component of the example gateway 480 can be discrete, combined with one or more other components of the gateway 480, and/or shared with another component (e.g., a wireless access controller) of a larger interconnected system.

The controller 404, the control engine 406, the communication module 408, the timer 410, the power module 44, the storage repository 430 (which can include protocols 432, algorithms 433, and stored data 434), the hardware processor 420, the memory 422, the transceiver 424, the application interface 426, the optional security module 428, the antennae 475, the switches 445, the power supply 440, the gateway components 442, and the housing 403 can be substantially the same as the corresponding components of the electrical device 102-1 discussed above with respect to FIG. 1.

Also, the storage repository 430 of the gateway 480 can include one or more algorithms 433 and/or protocols 432 to determine the location of each electrical device (e.g., electrical devices 102) in a volume of space (e.g., volume of space 199). These locations can be determined (e.g., calculated) by the control engine 406 using the various signal strength values associated with each electrical device, the time stamp associated with each signal strength value, and which electrical device is reporting a particular electrical device reporting the signal strength of another electrical device. In this way, the control engine 406 of the gateway 480 can generate and maintained one or more master tables based on the tables generated and maintained by the electrical devices.

Once the control engine 406 has assigned electrical devices to specific groups and/or areas in the volume of space, the control engine 406 can generate instructions, sent by the transceiver 424 as signals (e.g., signals 195) to particular electrical devices, groups of electrical devices, and/or electrical devices within a particular area. Such instructions can be with respect to commissioning the electrical devices. In addition, or in the alternative, such instructions can be with respect to operating the electrical devices.

Such instructions can also be with respect to how a particular electrical device maintains its own local table. For example, the control engine 406 of the gateway 480 can instruct, after determining that a certain electrical device A that was in one area in the volume of space has moved, another electrical device B that is in that area and was communicating with electrical device A to remove the records from its table associated with electrical device A. As another example, the control engine 406 of the gateway 480 can instruct an electrical device to remove the records from its table that are more than 10 minutes old.

Such instructions can also be with respect to polling and communicating conducted by one electrical device with other electrical devices. For example, the control engine 406 of the gateway 480 can instruct an electrical device as to how often to broadcast a signal to other electrical devices. The control engine 406 of the gateway can also instruct an electrical device to expand or contract the communication range of its transceiver.

In some cases, rather than or in addition to signal strength, some other parameter (angle of arrival, angle of departure) of a signal sent by one electrical device is measured by another electrical device. In such a case, the local tables generated and maintained by the electrical devices can include all of the parameters associated with the signals that are measured by the electrical devices. Similarly, the control engine 406 of the gateway 480 can generate and maintain one or more master tables using this information, and can also locate the electrical devices using this information in combination with one or more algorithms 433 and/or one or more protocols 432.

The optional user interface 431 of the gateway 480 can take on various forms and serve one or more of a number of functions. Examples of a user interface 431 can include, but are not limited to, an interactive touch screen, one or more pushbuttons, one or more dials, one or more switches, a keyboard, a mouse, and one or more slidebars. Some non-exclusive example functions that can be served by a user interface 431 can include displaying results (e.g., in a table, in a floor plan) locating electrical devices 102 within the volume of space 199 and allowing a user (e.g., user 150) to adjust a threshold value or a range of acceptable values (e.g., for age of a signal 195, for a signal strength value).

Figure 5:
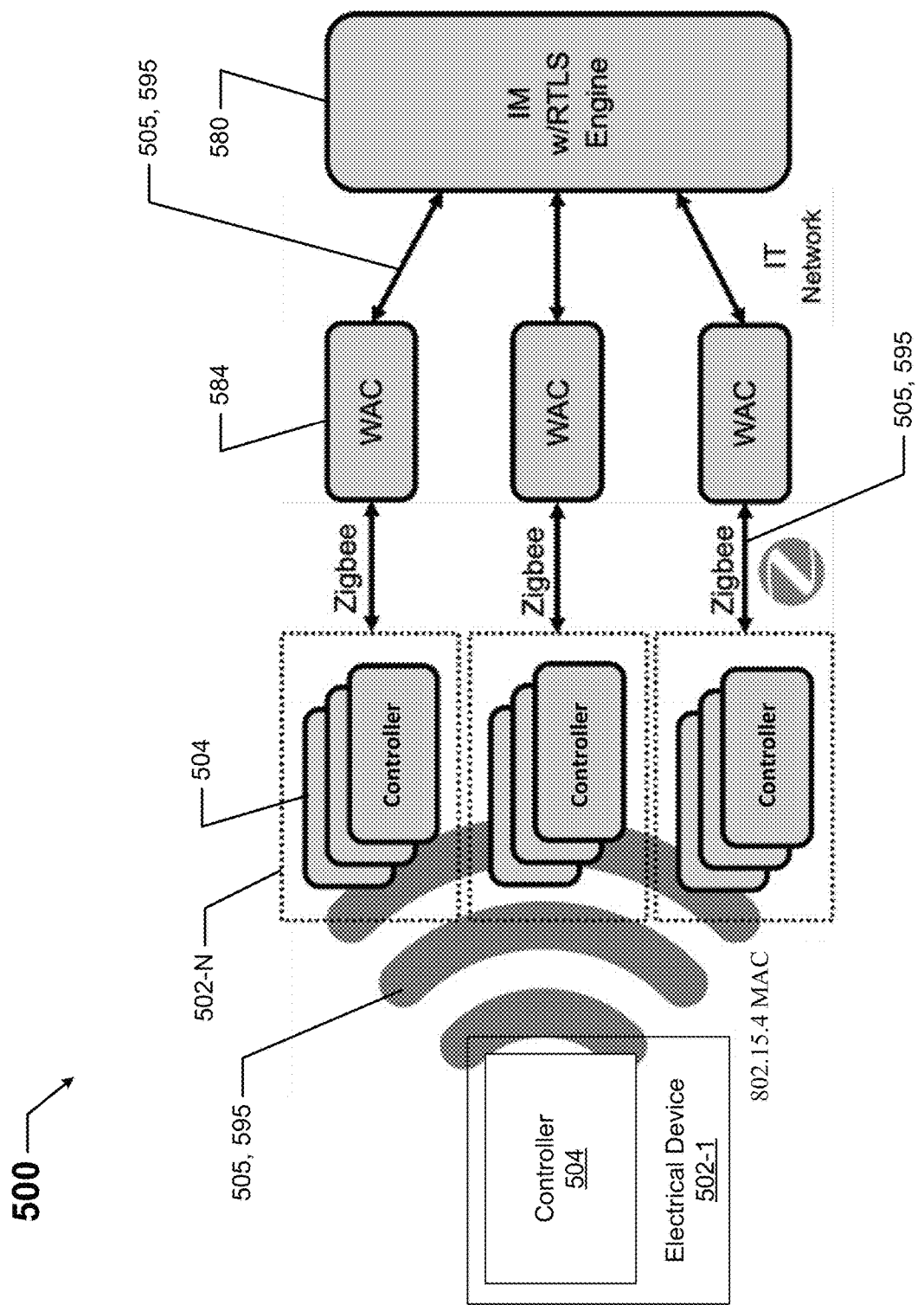
FIG. 5 shows a diagram of another system in accordance with certain example embodiments.

FIG. 5 shows a diagram of a system 500 in accordance with certain example embodiments. Specifically, the system 500 uses RTLS protocols to locate electrical devices 502 in the volume of space 599 in accordance with certain example embodiments. Referring to FIGS. 1 through 5, the system 500 of FIG. 5 includes electrical device 502-1 with a controller 504, a number of other electrical devices 502-N each having a controller 504, a number of wireless access controllers 584 (WACs 584), and a gateway 580 (also sometimes called an insight manager (IM) with a RTLS engine, a master controller, or a network manager). At least the electrical device 502-1 and the other electrical devices 502-N are located in the volume of space 599.

The system of FIG. 5 is arranged in a hierarchy, with the gateway 580 at the top of the structure, followed by the WACs 584, and then the electrical devices 502. The WACs 584 can be used when there are a large number of electrical devices 502 in the system 500. Aside from the WACs 584, which are not shown in the system 100 of FIG. 1, each of these components of the system 500 of FIG. 5 can be substantially the same as the corresponding component of the system 100 of FIG. 1.

Each WAC 584 (sometimes more simply called an access controller, as a generic term and/or when wired communication links 505 are involved) performs a number of different functions. For example, a WAC 584 can help communicate with and control the controller 504 of one or more electrical devices 502 to help control the operation of those electrical devices 502. For RTLS applications, the WAC 584 can be responsible for pairing with the Zigbee-enabled electrical devices 502, providing configuration data to the electrical devices 502, synchronizing the timing of those electrical devices 502, supporting the firmware of those electrical devices 502, upgrading those electrical devices 502, receiving location/telemetry data (e.g., using a Zigbee-enabled communication links 505) from the electrical devices 502, and/or performing any other function with respect to those electrical devices 502 to support RTLS activities.

When a WAC 584 receives data (e.g., packed egress data that arrives as ingress data) from an electrical device 502, the WAC 584 can convert the data into a different format (e.g., ECAPI). The WAC 584 can then send the newly-formatted data to the gateway 580. To help diagnose issues, a WAC 584 can maintain counters for each paired electrical device 502 and include, for example, the number of received packed data messages from a particular electrical device 502, the number of formatted messages successfully transmitted to the gateway 580 that pertain to the packed data from a particular electrical device 502, and the number of formatted messages pertaining to the packed data from a particular electrical device 502 that failed to transmit to the gateway 580.

In some cases, a WAC 584 maintains the average and maximum latency introduced between the receipt of a message from an electrical device 502 and transmission of a formatted message to the gateway 580. The WAC 584 can also notify the gateway 580 when the average or maximum latency exceeds a threshold value. Further, a WAC 584 can communicate to the gateway 580 when there is a significant discrepancy (e.g., as determined by the WAC 584) between the ingress and egress packets with respect to an electrical device 502. When there are multiple WACs 584, they can all be time-synchronized with each other. In some cases, the functionality of a WAC 584 can be the same as, or at least partially combined with, the functionality of the controller 504 of an electrical device 502. A WAC 584 can be located in the volume of space 599 or remotely from the volume of space 599.

In this particular case, the electrical devices 502 are the physical entities that are used to measure the signal strength values (and/or other parameters) of signals 595 sent by one or more other electrical devices 502. This signal strength information can be used by the gateway 580 to determine the location of the electrical devices 502 in the volume of space 599. In this example, the electrical devices 502 use 802.15.4 MAC (a protocol used on the communication links 505) to "beacon" or broadcast the signals 595 to any of the other electrical devices 502 within communication range of each other.

The local table established and maintained by each electrical device is populated with an identification of the electrical device 502 sending a signal 595, the strength (and/or other parameter) of that signal 595, and the time that the signal 595 is received. The information from the local table of each electrical device 502 is then sent as another one or more signals 595 addressed to the gateway 580 using the Zigbee protocol on the communication links 505. In this example, such signals 595 are sent through a WAC 584. These signals 595 sent by the electrical devices 502 to the gateway 580 to provide the gateway 580 with the information in the local tables can be sent continuously, after some interval of time (e.g., every 60 seconds), or upon the occurrence of some event (e.g., receipt of a new signal 595 from another electrical device 502). The frequency at which an electrical device 502 sends a signal 595 to the gateway 580 can be managed by the gateway 580.

The RSSI value and/or other parameter of a signal 595 measured by the controller 504 of the electrical device 502-1 can be used by the gateway 580 to locate, in real time, one or more of the other electrical devices 502-N within the volume of space 599 (e.g., in X-Y coordinates, in X-Y-Z coordinates). As used herein, "real time" refers to a user's perspective of the system and means that electrical devices 502 can be located within the time in which the signals are transmitted and processed, such as a few milliseconds to within a few seconds, which time is virtually real time from the perspective of a user (e.g., user 150).

The electrical devices 502 can communicate with each other using Inter-PAN. Further, the electrical devices 502 can communicate with one or more WACs 584 and/or the gateway 580 using Zigbee-enabled communication links 505. In this case, the electrical devices 502 are Zigbee-enabled devices as well as an Inter-PAN-enabled device, and so one or more particular electrical devices 502 can be paired with a single WAC 584. Similarly, a controller 504 of an electrical device 502 can be a Zigbee-enabled device as well as a InerPAN-enabled device, and so a controller 504 can be paired with a single WAC 584.

In some cases, electrical device 502-1 is not configured to determine the location of each of one or more of the other electrical devices 502-N based on the signals 595 received from those other electrical devices 502-N. In such a case, a WAC 584 and/or the gateway 580 can make such a determination using signals 595 generated and sent by the electrical device 502-1, where the signals 595 can include such information an identification of the other electrical devices 502-N, a signal strength value of signals 595 sent by the other electrical devices 502-N, and a time at which the signals 595 were sent by and/or received from the other electrical devices 502-N.

In addition to establishing groupings of electrical devices 502 using example embodiments, the components of the system 500 are configured to communicate with each other using communication signals 578 sent over the communication links 505. For example, the WACs 584, upon receiving communication signals 578 from the user systems 555 and/or the controllers 504 of the electrical devices 502 on the Zigbee-enabled communication links 505, send the information in these communication signals 578 (often in the form of new communication signals 578) to the gateway 580, which process all of this information (e.g., using one or more protocols 332 and/or algorithms 333) in real time. The gateway 580 can store this information and use it for trending analysis, predictive analysis, and/or any other analysis that may be useful.

BLE proximity methods are widely used in the industry to estimate the distance between a BLE transmitter (e.g., an electrical device 502) and a BLE receiver (e.g., a user device 555). In a dense and uniformly distributed infrastructure of electrical devices 502 (e.g., a lighting system), these methods can be optimized to achieve greater accuracy by comparing the RSSI at many BLE receivers and performing various calculations (by a user system 555, by a WAC 584, by the gateway 580) to estimate the location of an electrical device 502 in the volume of space 599 and determine whether the electrical device 502 should be assigned to a particular group.

Figure 6:
FIG. 6 shows a lighting system in a healthcare environment in accordance with certain example embodiments.

FIG. 6 shows a system 600 that can be used for providing real-time location of electrical devices 602 in a volume of space 699 in accordance with certain example embodiments. Referring to FIGS. 1 through 6, the lighting system 600 includes a number of electrical devices 602, principally in the form of light fixtures, located in a volume of space 699 that includes a hospital room within a clinic or hospital. A lighting system provides unique advantages for implementing an example RTLS because the density of the electrical devices (light fixtures) supports a dense network for assigning electrical devices 602 to groups. Of the electrical devices 602 that are light fixtures, there are seven troffer light fixtures and five down can light fixtures disposed in the ceiling of the room. There is also an electrical device 602 in the form of a computer monitor. In this case, each electrical device 602 includes a controller 604, substantially similar to the controller 104 discussed above. The controllers 604 of the electrical devices 602 are capable of communicating with each other and a gateway (not shown in FIG. 6).

Figure 7:
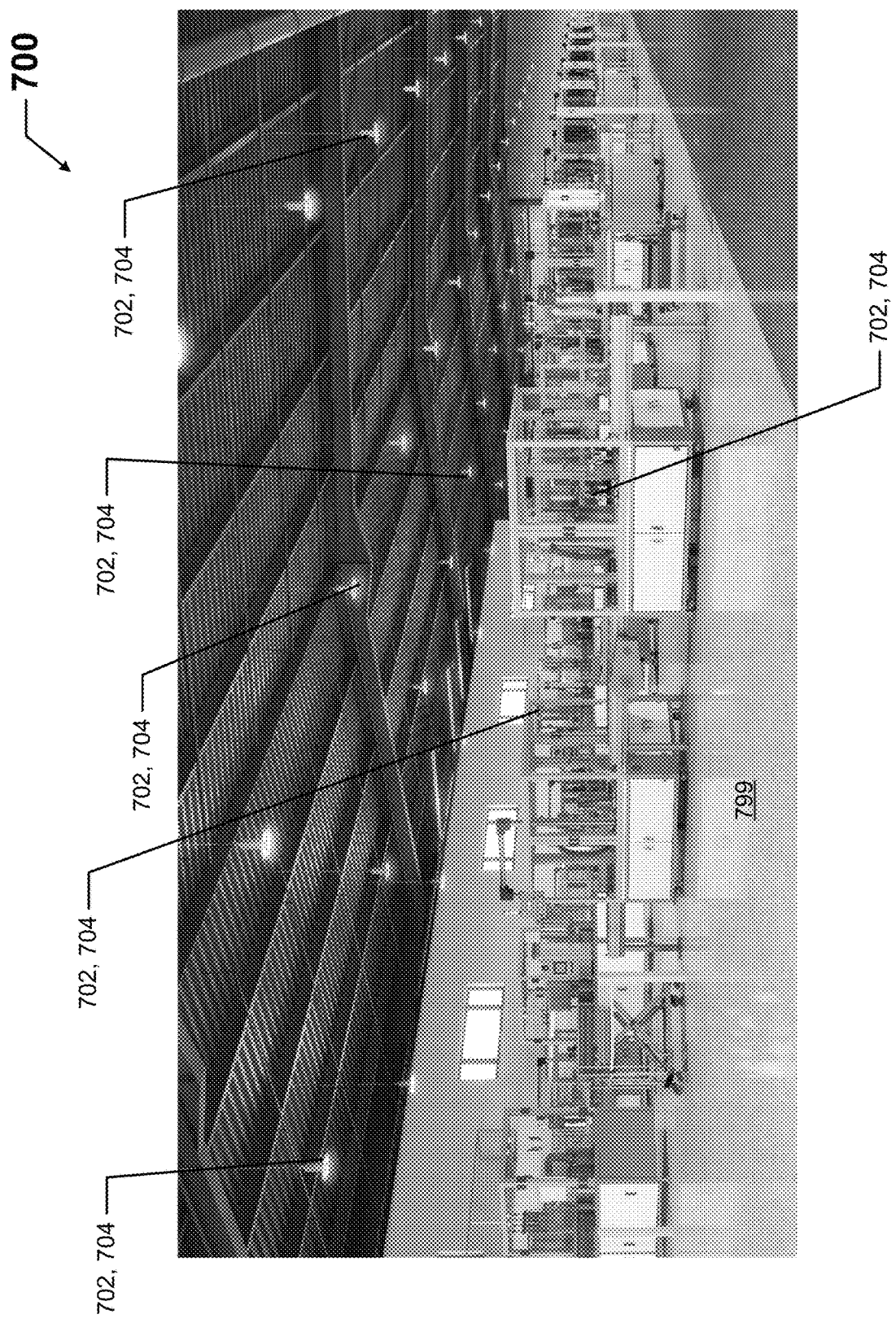
FIG. 7 shows a lighting system in a manufacturing environment in accordance with certain example embodiments.

FIG. 7 shows a system 700 that can be used for providing real-time location of electrical devices 702 in a volume of space 799 in accordance with certain example embodiments. Referring to FIGS. 1 through 7, the system 700 includes a number of electrical devices 702, principally in the form of light fixtures, located in a volume of space 799 that includes a manufacturing facility. Of the electrical devices 702 that are light fixtures, there are at least 56 Hi-Bay light fixtures suspended from the ceiling and at least 30 work stations located on the floor. In this case, each electrical device 702 includes a controller 704, substantially similar to the controller 104 discussed above with respect to FIG. 1. The controllers 704 of the electrical devices 702 are configured to communicate with each other and with a gateway (not shown in FIG. 7).

Figure 8:
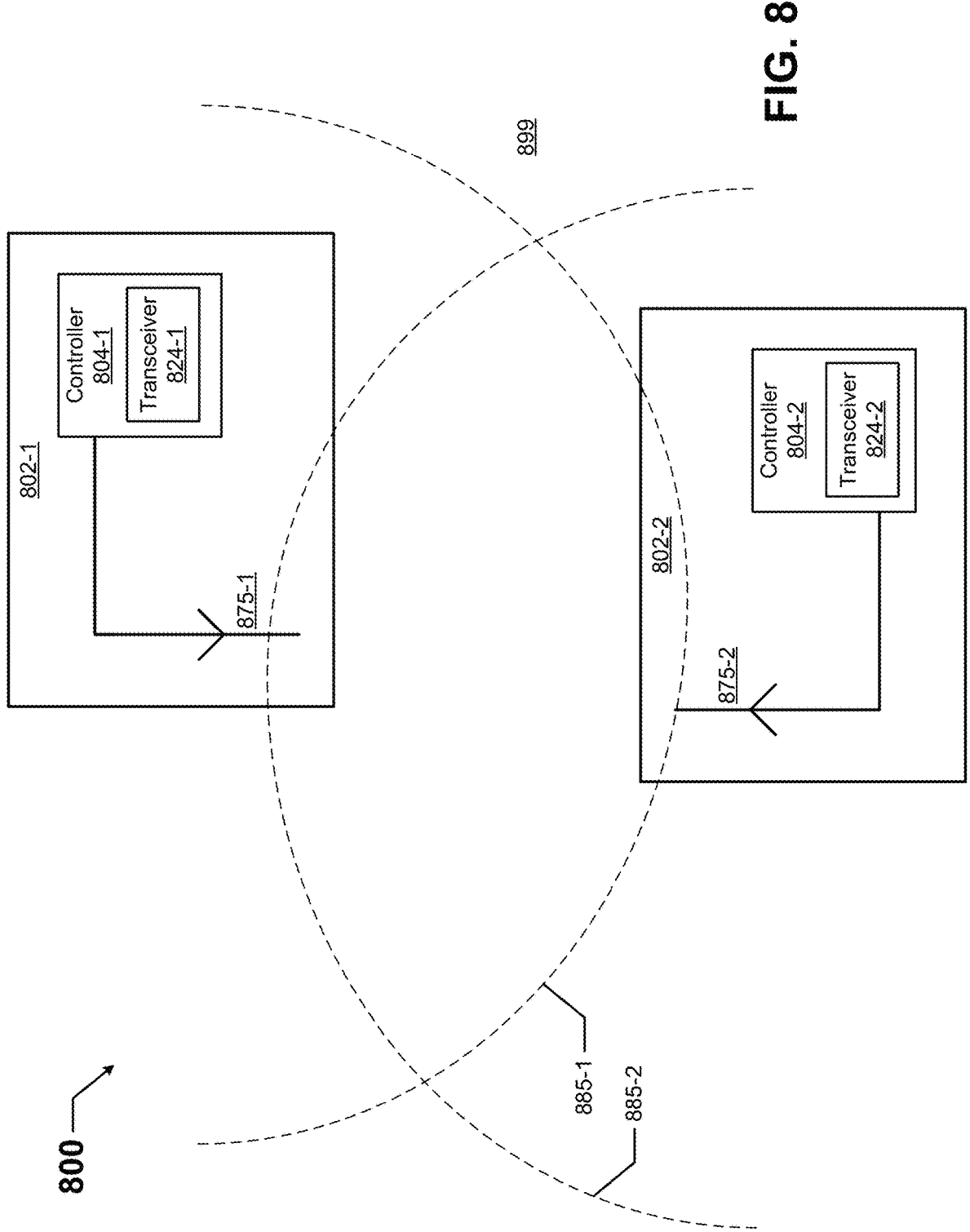
FIG. 8 shows a system for transceiving communication signals in a volume of space in accordance with certain example embodiments.

FIG. 8 shows a system 800 for transceiving communication signals in a volume of space 899 in accordance with certain example embodiments. Referring to FIGS. 1 through 8, located in the volume of space 899 of FIG. 8 are two electrical devices 802 (electrical device 802-1 and electrical device 802-2). Electrical device 802-1 has a controller 804-1 (including a transceiver 824-1) and an antenna 875-1. Electrical device 802-2 has a controller 804-2 (including a transceiver 824-2) and an antenna 875-2. These components of FIG. 8 are substantially the same as the corresponding components of FIG. 1 discussed above. The volume of space 899 can be of any size and/or in any location. For example, the volume of space 899 can be a room in an office building.

As shown in FIG. 8, the antenna 875-1 of electrical device 802-1 can be located in the volume of space 899. Alternatively, the antenna 875-1 can be located on another electrical device (e.g., another light fixture, on a thermostat, on a clock/radio, on a security camera). In any case, it is possible that the antenna 875-1 can be located outside the volume of space 899, as long as the signals (e.g., signals 195) sent by the antenna 875-2 of the electrical device 802-2 are received by the antenna 875-1 of electrical device 802-1. For example, when a signal is a RF signal, the signal can travel through walls, windows, floors, and ceilings.

The antenna 875-1, when combined with the transceiver 824-1 of the controller 804-1, has a communication range 885-1. The communication range 885-1 defines a maximum volume within the volume of space 899 in which the transceiver 824-1 can send and receive signals. Similarly, the antenna 875-2, when combined with the transceiver 824-2 of the controller 804-2, has a communication range 885-2, which defines a maximum volume within the volume of space 899 in which the electrical device 802-2 can send and/or receive signals. The electrical device 802-2 can also include a controller 804-2, such as the controller 104 described above with respect to FIG. 1.

In this case, the communication range 885-1 of the controller 804-1 of the electrical device 802-1 intersects with the communication range 885-2 of the controller 804-2 of the electrical device 802-2, which allows electrical device 802-1 and electrical device 802-2 to transmit signals directly between each other. Conversely, if the communication range 885-1 of the controller 804-1 of the electrical device 802-1 fails to intersect with the communication range 885-2 of the controller 804-2 of the electrical device 802-2 (if electrical device 802-1 is moved far enough away from electrical device 802-2), then electrical device 802-1 and electrical device 802-2 cannot communicate directly with each other.

Figure 9A:
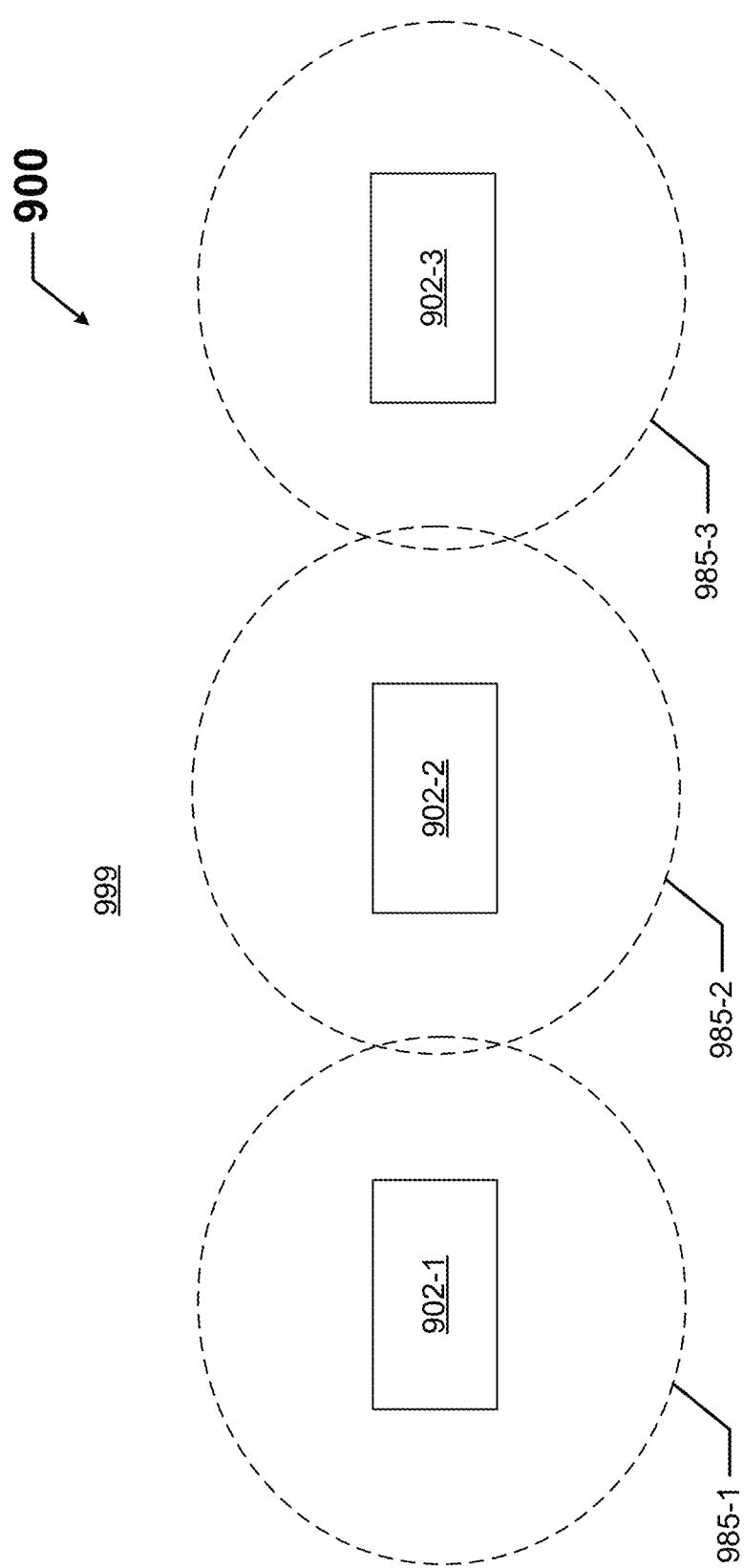
FIGS. 9A and 9B show a side and top view, respectively, of a system in a volume of space in accordance with certain example embodiments.
Figure 9B:
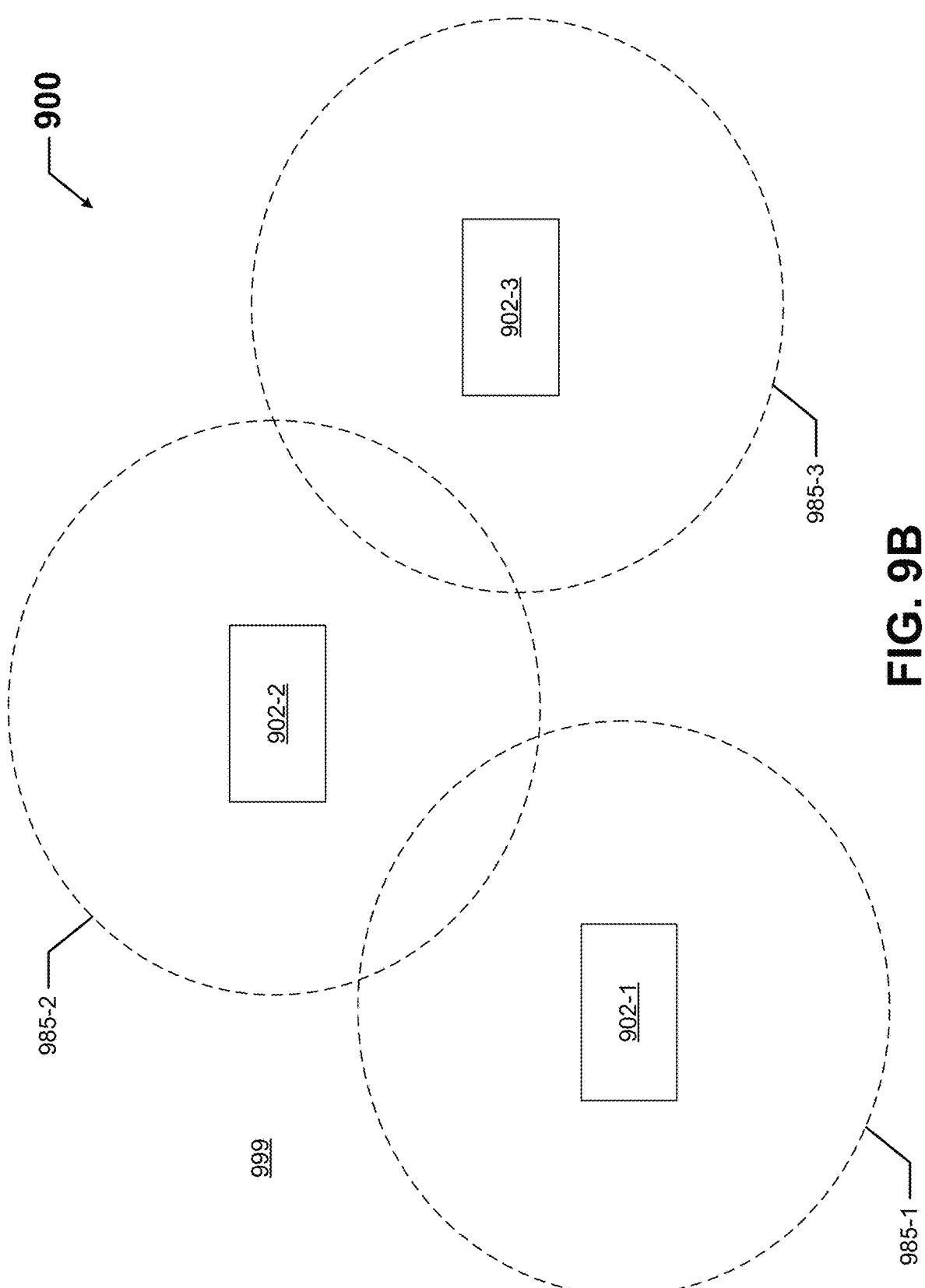

FIGS. 9A and 9B show a side and top view, respectively, of a system 900 in a volume of space 999 in accordance with certain example embodiments. Referring to FIGS. 1 through 9B, also located in the volume of space 999 of FIGS. 9A and 9B are three electrical devices 902 (specifically, electrical device 902-1, electrical device 902-2, and electrical device 902-3) in the form of light fixtures, where the electrical devices 902 are substantially similar to the electrical devices 102 of FIG. 1 above. As discussed above, the volume of space 999 can be of any size and/or in any location. For example, the volume of space 999 can be one or more rooms in a large office building.

As shown in FIGS. 9A and 9B, all of the electrical devices 902 can be located in the volume of space 999. Alternatively, one or more of the electrical devices 902 can be located outside the volume of space 999, as long as the signals (e.g., signals 195) sent by a transceiver (e.g., transceiver 124) of one electrical device 902 are received by a transceiver of one or more of the other electrical devices 902. Each of the electrical devices 902 can include a controller and an associated transceiver, substantially similar to the controller 104 and associated transceiver 124 discussed above. In this example, the transceiver of electrical device 902-1, electrical device 902-2, and electrical device 902-3 can include a Zigbee-enabled receiver and a 802.15.4 MAC-enabled transceiver. In such a case, the 802.15.4 MAC-enabled receiver of each electrical device 902 is capable of transmitting signals (e.g., response signals 377) in the form of RF signals with the other electrical devices 902.

In this case, the communication range 985-2 of electrical device 902-2 overlaps with the communication range 985-1 of electrical device 902-1 and with the communication range 985-3 of electrical device 902-3. However, the communication range 985-1 of electrical device 902-1 fails to overlap with the communication range 985-3 of electrical device 902-3. As a result, electrical device 902-1 and electrical device 902-2 can communicate directly with each other. Also, electrical device 902-2 and electrical device 902-3 can communicate directly with each other. However, electrical device 902-1 and electrical device 902-3 are unable to communicate directly with each other.

Figure 10:
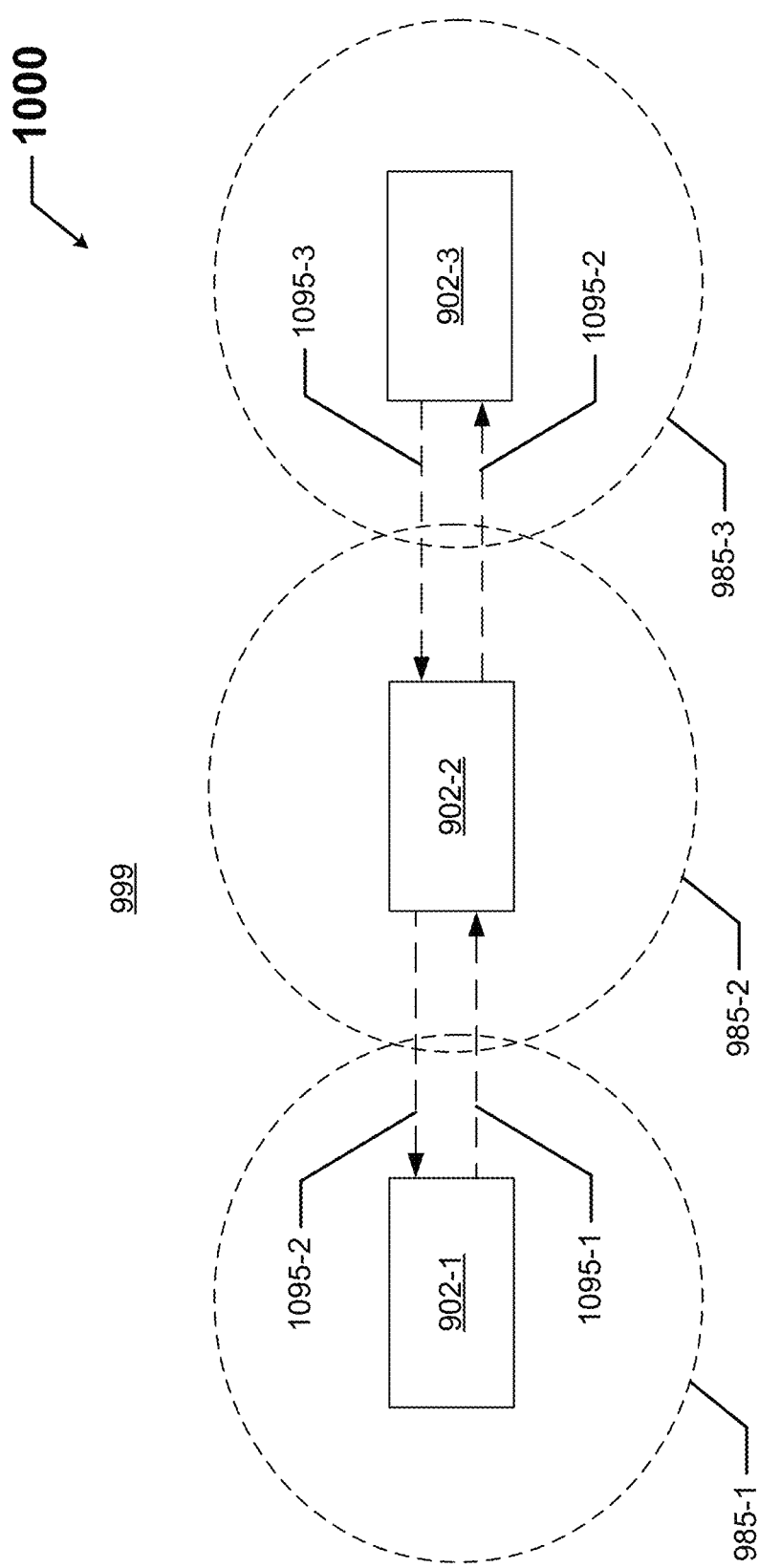
FIG. 10 shows the system of FIGS. 9A and 9B when signals are sent between electrical devices in accordance with certain example embodiments.

FIG. 10 shows a system 1000 that is identical to the system 900 of FIGS. 9A and 9B, except that the electrical devices 902 are broadcasting signals 1095 to each other. Referring to FIGS. 1 through 10, signal 1095-2 is broadcast by electrical device 902-2. Because communication range 985-1 and communication range 985-2 overlap each other, and because communication range 985-2 and communication range 985-3 overlap each other, electrical device 902-1 and electrical device 902-3 both receive the signal 1095-2 broadcast by electrical device 902-2.

As a result, the controller of electrical device 902-1 generates a local table that includes the identification of electrical device 902-2, the strength of signal 1095-2 (e.g., as measured by the transceiver of electrical device 902-1), and the time that signal 1095-2 was received. Similarly, the controller of electrical device 902-3 generates a local table that includes the identification of electrical device 902-2, the strength of signal 1095-2 (e.g., as measured by the transceiver of electrical device 902-3), and the time that signal 1095-2 was received.

Also, signal 1095-1 is broadcast by electrical device 902-1. Because communication range 985-1 and communication range 985-2 overlap each other, electrical device 902-2 receives the signal 1095-1 broadcast by electrical device 902-1. However, since communication range 985-1 and communication range 985-3 fail to overlap each other, electrical device 902-3 does not receive the signal 1095-1 broadcast by electrical device 902-1. As a result, the controller of electrical device 902-2 generates a local table that includes the identification of electrical device 902-1, the strength of signal 1095-1 (e.g., as measured by the transceiver of electrical device 902-2), and the time that signal 1095-1 was received.

Finally, signal 1095-3 is broadcast by electrical device 902-3. Because communication range 985-3 and communication range 985-2 overlap each other, electrical device 902-2 receives the signal 1095-3 broadcast by electrical device 902-3. However, since communication range 985-1 and communication range 985-3 fail to overlap each other, electrical device 902-1 does not receive the signal 1095-3 broadcast by electrical device 902-3. As a result, the controller of electrical device 902-2 generates a local table (or adds to the local table generated in the previous paragraph) that includes the identification of electrical device 902-3, the strength of signal 1095-3 (e.g., as measured by the transceiver of electrical device 902-2), and the time that signal 1095-3 was received.

Figure 11:
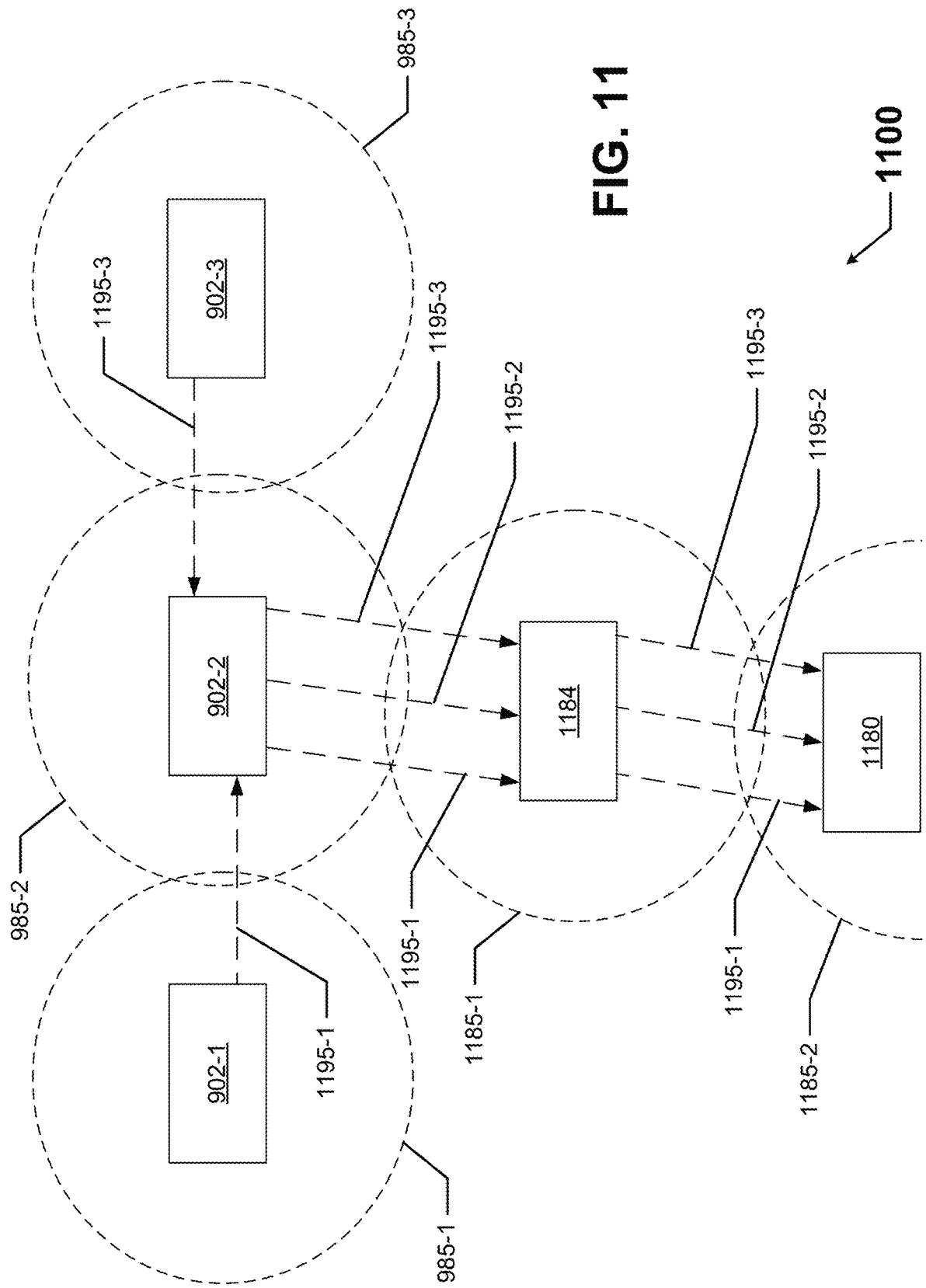
FIG. 11 shows the system of FIGS. 9A through 10 when signals are sent by electrical devices to a gateway in accordance with certain example embodiments.

FIG. 11 shows a system 1100 that is identical to the system 900 of FIGS. 9A and 9B, with the addition of a WAC 1184 and a gateway 1180. Referring to The gateway 1180 is substantially similar to the gateway of FIGS. 1 and 4 above. Further, the WAC 1184 is substantially similar to the WAC 584 of FIG. 5 above. FIGS. 1 through 11, the WAC 1184 has a broadcast range 1185-1 that overlaps with the broadcast range 985-2 of electrical device 902-2 and the broadcast range 1185-2 of the gateway 1180. The broadcast range 1185-1 of the WAC 1184 does not overlap with the broadcast range 985-1 of electrical device 902-1 or with the broadcast range 985-3 of electrical device 902-3.

As a result, electrical device 902-2 and the WAC 1184 can communicate directly with each other, but any communication between the WAC 1184 and electrical device 902-1 or between the WAC 1184 and electrical device 902-3 must occur indirectly through electrical device 902-2. Similarly, the gateway 1180 and the WAC 1184 can communicate directly with each other, but any communication between the gateway 1180 and electrical device 902-2 must be done indirectly through the WAC 1184. Further, any communication between the gateway 1180 and electrical device 902-1 or between the gateway 1180 and electrical device 902-3 must be done indirectly through the WAC 1184 and electrical device 902-2.

In this case, the electrical devices 902 are sending the information in their local tables to the gateway 1180. Specifically, electrical device 902-1 has generated and sends signal 1195-1 to the gateway 1180. Since signal 1195-1 is addressed to the gateway 1180, electrical device 902-2, upon receiving signal 1195-1, passes signal 1195-1 to the WAC 1184. Similarly, since signal 1195-1 is addressed to the gateway 1180, the WAC 1184, upon receiving signal 1195-1, passes signal 1195-1 to the gateway 1180. The signal 1195-1 sent by electrical device 902-1, through electrical device 902-2, through the WAC 1084, and to the gateway 1180 is sent using a higher level (e.g., Zigbee) protocol relative to what was used to broadcast the signals 1095 among the electrical devices 902, as shown in FIG. 10 above.

Also, electrical device 902-2 has generated and sends signal 1195-2 to the gateway 1180. Since signal 1195-2 is addressed to the gateway 1180, the WAC 1184, upon receiving signal 1195-2, passes signal 1195-2 to the gateway 1180. The signal 1195-2 sent by electrical device 902-2, through the WAC 1084, and to the gateway 1180 is sent using a higher level (e.g., Zigbee) protocol relative to what was used to broadcast the signals 1095 among the electrical devices 902, as shown in FIG. 10 above.

Finally, electrical device 902-3 has generated and sends signal 1195-3 to the gateway 1180. Since signal 1195-3 is addressed to the gateway 1180, electrical device 902-2, upon receiving signal 1195-3, passes signal 1195-3 to the WAC 1184. Similarly, since signal 1195-3 is addressed to the gateway 1180, the WAC 1184, upon receiving signal 1195-3, passes signal 1195-3 to the gateway 1180. The signal 1195-3 sent by electrical device 902-3, through electrical device 902-2, through the WAC 1084, and to the gateway 1180 is sent using a higher level (e.g., Zigbee) protocol relative to what was used to broadcast the signals 1095 among the electrical devices 902, as shown in FIG. 10 above.

When the gateway 1180 receives the signals 1195 from the electrical devices 902, the gateway 1180 can generate a master table that uses the information contained in the signals 1195 to determine proximity the electrical devices 902 relative to each other in the volume of space 999. In some cases, the gateway 1180 can determine the actual position of one or more of the electrical devices 902 in the volume of space 999. As a result, the gateway 1180 can assign the electrical devices 902 to one or more groups and/or areas for commissioning and/or operations. Once the gateway 1180 has made those assignments, the gateway 1180 can push instructions, settings, and/or other parameters using one or more signals to the electrical devices 902 using one or more signals sent under the higher level (e.g., Zigbee) protocol relative to what was used to broadcast the signals 1095 among the electrical devices 902, as shown in FIG. 10 above.

Example embodiments can use existing signal strength information (e.g., using RSSI) captured at lower level communication protocol layers (e.g., 802.15.4 MAC) to create new tables and/or update existing tables at higher level communication protocol layers (e.g., Zigbee). The information in each of these new tables can be incorporated into one or more signals and sent using the higher level communication protocol. Since the higher level communication protocols have low bandwidths, the information in the signals for example embodiments are limited to the signal strength associated with particular electrical devices, and in some cases a time stamp of those signals. Example embodiments can be used for one or more of a number of purposes, including but not limited to location of an electrical device in a volume of space, commissioning an electrical device, and creating multiple zones of electrical devices.

Example embodiments have the benefit of saving time and money over the current art. For example, in commissioning multiple electrical devices, example embodiments allow the electrical devices to establish proximity to other electrical devices. This can create groupings and/or areas that can be used in commissioning and/or operation of those electrical devices. By contrast, in the current art, a user must manually make those assignments, which, in addition to taking longer, can present the risk of a suboptimal grouping and/or the omission of an electrical device being assigned to a group or area.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for commissioning a plurality of electrical devices in a volume of space, comprising:
   a first electrical device of the plurality of electrical devices disposed in the volume of space and comprising a first controller having a first transceiver, wherein the first transceiver sends a first signal using a first communication protocol, wherein the first signal includes at least a first ID of the first electrical device;
   a second electrical device of the plurality of electrical devices disposed in the volume of space, wherein the second electrical device comprises a second controller having a second transceiver, wherein the second transceiver receives the first signal using the first communication protocol, wherein the second controller measures a first strength of the first signal, wherein the second controller generates a first table that includes the first strength and the first ID of the first electrical device;
   a third electrical device of the plurality of electrical devices disposed in the volume of space and communicably coupled to the second electrical device, wherein the third electrical device comprises a third controller and a third transceiver, wherein the third transceiver sends a second signal using the first communication protocol, wherein the second signal is received by the second transceiver of the second electrical device, wherein the second controller of the second electrical device further measures a second strength of the second signal, wherein the second controller modifies the first table to include the second strength of the second signal and a second ID of the third electrical device, wherein the second transceiver sends a third signal using a second communication protocol, wherein the third signal includes at least the first ID, second ID, first strength and second strength; and
   a gateway communicably coupled to the second electrical device, wherein the gateway:
      receives the third signal from the second electrical device; and
      determines the first electrical device and the second electrical device are in a first group using the first strength of the first electrical device; and
      transmitting, using the second communication protocol, operating instructions for the first group to the second electrical device.

2. The system of claim 1, wherein the gateway comprises a third controller.

3. The system of claim 1, wherein the second transceiver of the second electrical device further sends a fourth signal using the first communication protocol to the first transceiver of the first electrical device, wherein the first controller measures a third strength of the fourth signal, wherein the first controller generates a second table that includes the third strength and a third ID of the second electrical device, wherein the first transceiver sends a fifth signal using the second communication protocol to the gateway, wherein the fifth signal includes the third strength, wherein when determining the first device and second device are in the first group, the gateway also uses the third strength.

4. The system of claim 1, wherein the gateway:
determines that the third device should not be in the first group based at least in part on the second strength.

5. The system of claim 1, further comprising:
a wireless access controller (WAC) communicably disposed between the second electrical device and the gateway, wherein the WAC receives the third signal from the second electrical device and forwards the third signal to the gateway based on an address to the gateway in the third signal.

6. The system of claim 1, wherein the first communication protocol is for a lower layer relative to a higher layer with the second communication protocol.

7. The system of claim 6, wherein the first communication protocol is 802.15.4 MAC, and wherein the second communication protocol is Zigbee.

8. The system of claim 6, wherein the second communication protocol is employed in a mesh network that includes the first electrical device and the second electrical device.

9. The system of claim 1, wherein the third signal is sent to the gateway in multiple parts.

10. The system of claim 1, wherein the first signal comprises a radio frequency signal.

11. The system of claim 10, wherein the first electrical device further comprises at least one antenna coupled to the first transceiver.

12. The system of claim 1, wherein the first electrical device comprises a light fixture.

13. The system of claim 1, wherein the first table further comprises a time stamp of when the first signal was received from the first electrical device by the second electrical device.

14. The system of claim 13, wherein the second electrical device removes information about the first signal from the first table when an amount of time has lapsed since a subsequent signal is received from the first electrical device by the second electrical device.

15. The system of claim 13, wherein the third signal further comprises the time stamp.

16. The system of claim 15, wherein the gateway instructs the second electrical device to remove information about the first signal from the first table when the gateway determines that the first signal is received by another electrical device in a different area in the volume of space.

17. The system of claim 1, wherein the first communication protocol is different than the second communication protocol.

18. The system of claim 1, wherein the gateway sends subsequent instructions to at least one electrical device of the first group using the second communication protocol, wherein the subsequent instructions are used to operate the first group.

* * * * *